United States Patent
Zhu et al.

(10) Patent No.: US 10,856,167 B2
(45) Date of Patent: Dec. 1, 2020

(54) ENHANCED MULTIPLE ACCESS POINT COORDINATION

(71) Applicant: Intel Corporation, Santa Clara, CA (US)

(72) Inventors: Jing Zhu, Portland, OR (US); Juan Fang, Portland, OR (US); Laurent Cariou, Portland, OR (US); Dave Cavalcanti, Beaverton, OR (US); Feng Jiang, Santa Clara, CA (US); Ziv Kfir, Yavne (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/233,041

(22) Filed: Dec. 26, 2018

(65) Prior Publication Data

US 2019/0132762 A1    May 2, 2019

Related U.S. Application Data

(60) Provisional application No. 62/650,513, filed on Mar. 30, 2018.

(51) Int. Cl.
| | |
|---|---|
| *H04W 24/08* | (2009.01) |
| *H04W 24/10* | (2009.01) |
| *H04W 40/02* | (2009.01) |
| *H04W 56/00* | (2009.01) |
| *H04B 7/024* | (2017.01) |

(Continued)

(52) U.S. Cl.
CPC ............ *H04W 24/10* (2013.01); *H04B 7/024* (2013.01); *H04W 24/08* (2013.01); *H04W 40/02* (2013.01); *H04W 56/004* (2013.01); *H04W 56/0015* (2013.01); *H04W 84/12* (2013.01); *H04W 88/12* (2013.01)

(58) Field of Classification Search
CPC ... H04W 24/10; H04W 56/004; H04W 7/024; H04W 56/0015; H04W 40/02; H04W 24/08; H04W 88/12; H04W 84/12
See application file for complete search history.

(56) References Cited

U.S. PATENT DOCUMENTS

| | | | |
|---|---|---|---|
| 2014/0062793 A1* | 3/2014 | Alsindi | G01S 5/0215 342/458 |
| 2015/0009879 A1* | 1/2015 | Kim | H04W 52/0235 370/311 |

(Continued)

FOREIGN PATENT DOCUMENTS

EP    3525511 A1 * 11/2017    ............ H04W 24/10

*Primary Examiner* — Jay P Patel
(74) *Attorney, Agent, or Firm* — Eversheds Sutherland (US) LLP

(57) ABSTRACT

This disclosure describes systems, methods, and devices related to enhanced multiple access point (AP) coordination. A device may determine a first access point (AP) is an associated AP of a station device (STA). The device may identify a null data packet announce (NDPA) frame received from the first AP. The device may determine a propagation delay between the first AP and the device based on the NDPA frame. The device may identify a multi-AP trigger frame received from the first AP at a first time. The device may cause a data packet to be sent to the STA at a second time, wherein the second time is based on the propagation delay.

20 Claims, 17 Drawing Sheets

(51) Int. Cl.
*H04W 84/12* (2009.01)
*H04W 88/12* (2009.01)

(56) References Cited

U.S. PATENT DOCUMENTS

| | | | |
|---|---|---|---|
| 2015/0085780 A1* | 3/2015 | Kim | H04W 72/0406 |
| | | | 370/329 |
| 2015/0103767 A1* | 4/2015 | Kim | H04W 74/06 |
| | | | 370/329 |
| 2016/0164594 A1* | 6/2016 | Shapira | H04B 7/0452 |
| | | | 375/267 |
| 2016/0274229 A1* | 9/2016 | Oh | G01S 5/14 |
| 2016/0323863 A1* | 11/2016 | Park | H04W 4/70 |
| 2016/0330732 A1* | 11/2016 | Moon | H04B 7/0617 |
| 2016/0374085 A1* | 12/2016 | Chun | H04W 52/247 |
| 2017/0059701 A1* | 3/2017 | Oh | G01S 13/74 |
| 2017/0127440 A1* | 5/2017 | Chun | H04L 5/0037 |
| 2018/0041990 A1* | 2/2018 | Venkatesan | G01S 5/00 |
| 2018/0132278 A1* | 5/2018 | Oteri | H04W 74/02 |
| 2019/0041509 A1* | 2/2019 | Jiang | H04W 24/10 |
| 2019/0261369 A1* | 8/2019 | Verma | H04W 72/0453 |
| 2019/0268892 A1* | 8/2019 | Gidvani | H04W 48/16 |
| 2019/0306920 A1* | 10/2019 | Son | H04W 80/08 |

* cited by examiner

ENHANCED MULTIPLE ACCESS POINT COORDINATION

CROSS-REFERENCE TO RELATED APPLICATION(S)

This application claims the benefit of U.S. Provisional Application No. 62/650,513, filed Mar. 30, 2018, the disclosure of which is incorporated herein by reference as if set forth in full.

TECHNICAL FIELD

This disclosure generally relates to systems, methods, and devices for wireless communications and, more particularly, enhanced multiple access point (AP) coordination in extremely high throughput (EHT).

BACKGROUND

Wireless devices are becoming widely prevalent and are increasingly requesting a determination of their locations. For example, wireless devices inside a location such as a mall, airport or other locations may request a determination of their locations from control devices such as access points (APs). Typically, communications with at least three APs are needed to determine a location of a wireless device.

DETAILED DESCRIPTION

Figure 1:
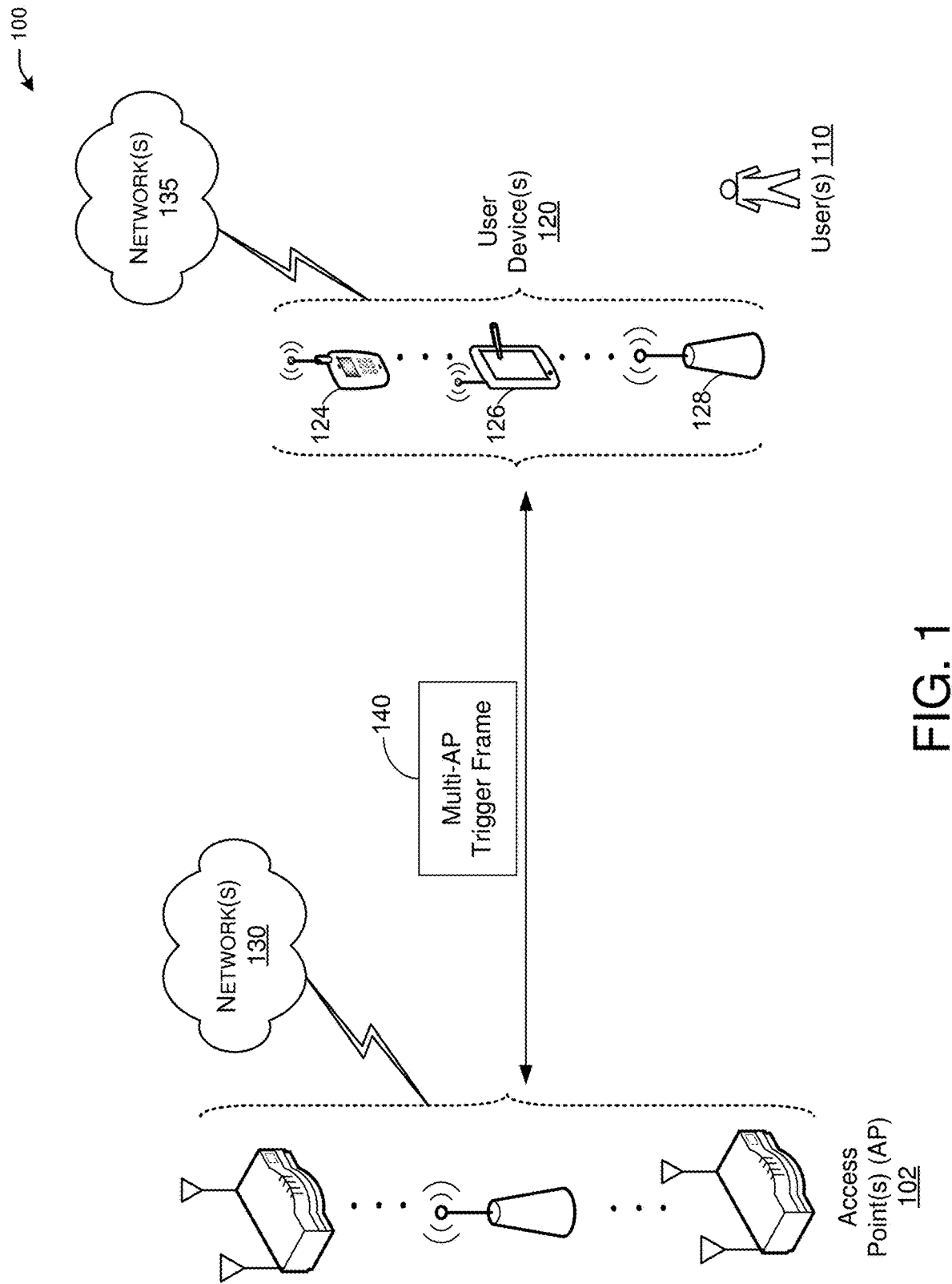
FIG. 1 depicts a diagram illustrating an example network environment of an illustrative enhanced multiple access point (AP) coordination system, in accordance with one or more example embodiments of the present disclosure.

Example embodiments described herein provide certain systems, methods, and devices, for enhanced multiple access point (AP) coordination.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

One or more station devices may operate within a wireless time sensitive networking (TSN) environment. The wireless TSN environment may be an indoor area, an outdoors area, or both. The wireless TSN environment may include one or more TSN domains, such as Ethernet TSN domain and/or Wireless TSN domain. The Ethernet TSN domain may include a network of one or more devices that communicate using an Ethernet communication protocol. For example, the Ethernet TSN domain may include a Wireless TSN controller and one or more APs. Each device in the Ethernet TSN domain may communicate with one or more other devices in the Ethernet TSN domain using an Ethernet communication protocol. According to some embodiments, the devices within the Ethernet TSN domain may be located within a ceiling of the wireless TSN environment.

The wireless TSN environment may include a Wireless TSN domain. The Wireless TSN domain may include a network of one or more devices that communicate using a wireless communication protocol (e.g., a communication protocol defined in one or more Institute of Electrical and Electronics Engineers (IEEE) 802.11 standards and/or amendments). For example, the Wireless TSN domain may include a Wireless TSN controller, one or more APs, and one or more station devices (STAs). Note that some devices within the Wireless TSN domain may also be included within the Ethernet TSN domain. Each device in the Wireless TSN domain may communicate with one or more other devices in the Wireless TSN domain using a Wireless communication protocol. The devices within the Wireless TSN domain may be located within a ceiling of the wireless TSN environment and/or on a floor of the wireless TSN environment.

The Wireless TSN controller may communicate with one or more of the APs. The Wireless TSN controller may select one of the APs as the associated AP for a STA within the Wireless TSN domain.

The APs within the wireless TSN environment may be configured to communicate with the Wireless TSN controller and with one or more of the STAs within the Wireless TSN domain. As noted above, one AP may be selected (e.g., by the Wireless TSN controller) as the associated AP for a station device and the other APs (e.g., the APs that are not selected as the associated AP) may be selected as coordinated APs. The associated AP may coordinate communication between the APs and a STA.

Any number of STAs may be included within the wireless TSN environment. The STAs within the wireless TSN environment may be configured to communicate with one or more of the APs within Wireless TSN domain. The STAs may operate with certain minimum latency and/or reliability requirements. For example, the STAs may require controlled latency and high reliability for real-time applications such as gaming, robotics, and/or industrial automation.

Recently, the need to improve latency and reliability has been introduced in new IEEE 802.11 standard initiatives. A Real Time Applications Top Interest Group (RAT-TIG) has been created within the IEEE 802.11 working group to investigate the requirement and issues to control latency and to increase reliability for real time application including gaming, robotics, and industrial automation. Extreme high throughput (EHT) and low latency requirements have also been introduced as a goal for the next major 802.11 release.

Multi-AP coordination will be one of the major features in EHT. Multi-AP coordination may enable capacity gains as well as low latency and high reliability.

Multi-AP coordination may be implemented in the uplink and in the downlink. Multiple coordinated APs may be located in different locations. These multiple coordinated APs may operate at the same channel. In the uplink, the multiple coordinated APs may be requested to receive the uplink data packet sent from the same STA (which may be a sensor or same set of sensors) and may forward the uplink data packet (e.g., UL MU OFDMA/MIMO) to the Wireless TSN controller. The use of multiple coordinated APs may improve the uplink reliability, for example by taking advantage of multiple path diversity. For example, the use of multiple coordinated APs may allow high reliability even in the presence of an obstruction between one of the multiple coordinated APs and the STA.

In the downlink, the multiple coordinated APs in different locations and operating at the same channels may be triggered (e.g., by an associated AP as designated by the Wireless TSN controller) to send the same data packet (e.g., DL MU OFDMA/DL MU MIMO) distributed from the Wireless TSN controller to the same STA (e.g., which may be an actuator or a same set of actuators) simultaneously. The use of multiple coordinated APs may improve the downlink reliability, for example by taking advantage of higher receive signal strength (RSS).

During the above process (e.g., during the sending of the downlink data packet to the STA from each AP), a propagation delay of the multi-AP trigger frame from the associated AP to the different coordinated APs and a propagation delay of the downlink data frame from the coordinated APs to the STA may be different according to their respective locations. As a result, the downlink data packet may arrive at the STA with different propagation delays, which may be hard to compensate for at the STA side. A procedure to better account for the respective propagation delays of multiple APs is needed.

Example embodiments of the present disclosure relate to systems, methods, and devices for enhanced multiple AP coordination.

According to some embodiments, an enhanced multiple AP coordination system may implement a protocol that allows for multiple AP coordination, which may allow the APs to improve the downlink performance to the STA (e.g., a sensor, an actuator, or the like).

According to some embodiments, the enhanced multiple AP coordination system may select an AP as the associated AP of a STA. The enhanced multiple AP coordination system may select the associated AP of the STA from among the APs that are in communication with the STA. All of the APs (or a subset of the APs) that are in communication with the STA may be considered coordinated APs. The selected associated AP may follow the clear channel assessment (CCA) rules defined in the 802.11 specification to contend for the channel. The selected associated AP may send a multi-AP trigger frame to all of the coordinated APs that serve the actuator (e.g., that serve the STA).

According to some embodiments, the enhanced multiple AP coordination system may cause the coordinated APs to transmit a downlink data packet to the STA in response to the multi-AP trigger frame. The downlink data packet may include one or more transmission parameters indicated in the multi-AP trigger frame. The downlink data packet may be sent to the STA a short interframe space (SIFS) time after the reception of the multi-AP trigger frame. The downlink data packet may be received by the coordinated APs from the Wireless TSN controller. The downlink data packet may include the data intended for operation of the STA.

According to some embodiments, the enhanced multiple AP coordination system may cause the STA to receive the multi-AP trigger frame from the associated AP. Upon the reception of the multi-AP trigger frame from the associated AP, the STA may wait for the downlink data packet from each of the coordinated APs. The STA may transmit as feedback an acknowledgement (ACK) frame to the coordinated APs SIFS time after the successful reception of the downlink data packet.

According to some embodiments, the enhanced multiple AP coordination system may include a STA that may be used for a real time application that includes heightened latency and reliability requirements. During the above process (e.g., during the sending of the downlink data packet to the STA from each coordinated AP, a propagation delay of the multi-AP trigger frame from the associated AP to the different coordinated APs and a propagation delay of the downlink data frame from the coordinated APs to the STA may be different according to their respective locations. As a result, the downlink data packet may arrive at the STA with different propagation delays, which may be hard to compensate for at the STA.

According to some embodiments, the enhanced multiple AP coordination system may be improved by a simulation of the performance of multi-AP coordination for sending a downlink data packet to a STA at various locations. For the purposes of the simulation, four APs are uniformly located in a large 80 meter by 80 meter environment (e.g., in a factory environment). For example, AP1 is located at (−20 meters, −20 meters). AP2 is located at (−60 meters, −20 meters). AP3 is located at (−20 meters, −60 meters). AP4 is located at (−60 meters, −60 meters). For the purposes of the simulation, each AP is simulated to have one antenna.

According to some embodiments, the enhanced multiple AP coordination system may be improved by a simulation in which the performance of a STA with a single antenna is evaluated for 15 different locations. The performance of the STA for each location is evaluated under four scenarios: 1) single AP; 2) multi-AP without accounting for any propagation delay; 3) multi-AP accounting for propagation delay from the coordinated APs to the STA; and 4) multi-AP accounting for propagation delay from the associated AP to the coordinated APs and for propagation delay from the coordinated APs to the STA.

According to some embodiments, the enhanced multiple AP coordination system may be improved by comparing the downlink performance of the STA with single-AP (e.g., scenario 1 above) to the performance of the STA multi-AP without accounting for any propagation delay (e.g., scenario 2 above). The simulation shows that when the STA is close to all of the APs (e.g., location 5, 9, 12, 14, and 15), the performance of the STA may be improved with multi-AP coordination technology. The performance of the STA may be further improved by accounting for the propagation delay from the coordinated APs to the STA (e.g., scenario 3 above). However, the benefit of multiple AP coordination may be diminished when accounting for propagation delay from the associated AP to the coordinated APs and for propagation delay from the coordinated APs to the STA (e.g., scenario 4 above). Note that the simulated performances of the STA may be different with different locations of the APs, different locations of the STA, different cyclic prefix lengths, and/or different channel conditions.

According to some embodiments, the enhanced multiple AP coordination system may avoid the effect of the propagation delay to the multiple AP coordination by compensating for the propagation delay. Removing the effect of the propagation delay from multiple APs to the STA for the downlink data transmission may be difficult. However, given that each of the coordinated APs may exchange information through a wired/wireless backbone, it may be possible to remove the effect of the propagation delay due to the trigger frame transmission. The following description proposes how to remove the effect of the propagation delay of the multi-AP trigger frame from an associated AP to multiple coordinated APs in a multi-AP coordination to improve the reliability with an enhanced multiple AP coordination performance.

According to some embodiments, the enhanced multiple AP coordination system may implement a protocol for Multi-AP joint transmissions from multiple coordinated APs to one or multiple STAs that improves performance by allowing a compensation of propagation delays between coordinated APs (e.g., so that the coordinated APs may start transmitting to a STA at the same time, or at approximately the same time).

According to some embodiments, the enhanced multiple AP coordination system may implement a multi-AP coordination protocol that may include three phases. A first phase may include a phase during which the multi-AP joint transmission is established and negotiated. For example, the first phase may include a capability exchange between the APs, a negotiation of parameters, an indication of the AP that has been selected as the associated AP that sends the Multi-AP trigger frame, and an indication that the other APs (e.g., the APs that are not selected as the associated AP) are designed as the coordinated APs. The first phase may be performed only once or infrequently (e.g., in response to an indication that an AP has been added to and/or removed from the wireless TSN environment).

According to some embodiments, the enhanced multiple AP coordination system may implement a multi-AP coordination protocol that may include a second phase during which each coordinated AP may estimate a propagation delay from the associated AP to the coordinated AP. The second phase may be performed during an initiation of the associated AP and/or during an associated of a coordinated APs. An estimation of a propagation delay from the associated AP to the coordinated AP may be performed using single user protocol (e.g., fine timing measurement (FTM) and/or a single user scheme set forth in 802.11az) or using a multi-user protocol (e.g., a multi-user protocol set forth in 802.11ax). The second phase may be performed infrequently (for example only when a propagation delay may be supposed to have changed, such as when a distance between the coordinated APs and/or the associated AP has changed). Because many deployment scenarios may be very static, the second phase may only happen once.

According to some embodiments, the enhanced multiple AP coordination system may implement a multi-AP coordination protocol that may include a third phase during which downlink data may be sent to the serving STAs from each of the different coordinated APs in a simultaneous manner. The third phase may start with the associated AP sending a multi-STA trigger frame to the coordinated APs. During the third phase, each coordinated AP may compensate for the propagation delay by transmitting the downlink data in response to the received Multi-AP trigger after a time that may be equal to SIFS minus the determined propagation delay, as explained in greater detail below. The third phase may occur every time a downlink data packet is to be sent from the coordinated APs to the STA.

According to some embodiments, the enhanced multiple AP coordination system may implement the above-described protocol to mitigate the effect of the respective propagation delays between the coordinated APs and the associated AP in a multi-AP coordination system.

According to some embodiments, the enhanced multiple AP coordination system may compensate for the propagation delay from the associated AP to all of the coordinated APs, wherein the propagation delay between all of the coordinated APs may be estimated and/or stored in each of the coordinated APs. The estimation of the propagation delay may be obtained through one or more of a fine time measurement (FTM) procedure and/or through a more accurate mechanism defined in the 802.11az standard. Note that the 802.11az standard also defines a way to perform propagation delay estimation for multiple STAs at the same time, and propagation delay estimation may be applied so that all coordinated APs estimated the propagation delay to the selected associated AP at the same time.

According to some embodiments, the enhanced multiple AP coordination system may determine that after each of the coordinated APs has estimated its propagation delay to the associated AP and transmitted an indication of its propagation delay to the other coordinated APs, each coordinated AP within the coordinated group of APs would have stored the propagation delay information with all of the other APs within the coordinated group of APs. This stored propagation delay information may be used according to the following procedures to improve the downlink performance to the STA.

According to some embodiments, the enhanced multiple AP coordination system may select an AP as the associated AP of the STA. The enhanced multiple AP coordination system may select the associated AP of the STA from among the APs that are in communication with the STA. The selected associated AP may follow the CCA rules defined in the 802.11 specification to contend for the channel. If the operation channel(s) is/are available, the selected associated AP may send a multi-AP trigger frame to all of the coordinated APs that serve the STA (e.g., that serve the STA, which may be an actuator).

According to some embodiments, the enhanced multiple AP coordination system may cause the coordinated APs to transmit a downlink data packet to the STA in response to the multi-AP trigger frame. The downlink data packet may include one or more transmission parameters indicated in the multi-AP trigger frame. The downlink data packet may be sent to the STA by a coordinated AP a short interframe space (SIFS) time after the reception of the multi-AP trigger frame minus the estimated propagation delay from the associated AP to the coordinated AP. As a result, each of the coordinated APs may send the downlink data packets to the STA at the same time (or at approximately the same time).

According to some embodiments, the enhanced multiple AP coordination system may cause the STA to receive the multi-AP trigger frame from the associated AP. Upon the reception of the multi-AP trigger frame from the associated AP, the STA may wait for the downlink data packet from each of the coordinated APs. The STA may transmit as feedback an acknowledgement (ACK) frame to the coordinated APs a SIFS time after the successful reception of the downlink data packet.

According to some embodiments, the enhanced multiple AP coordination system may implement the multi-AP coordination protocol in three phases. A first phase may include a phase during which the multi-AP joint transmission is established and negotiated. For example, the first phase may include a capability exchange between the APs, a negotiation of parameters, an indication of the AP that has been selected as the associated AP that sends the Multi-AP trigger frame, and an indication that the other APs (e.g., the APs that are not selected as the associated AP) are designed as the coordinated APs. The first phase may be performed only once or infrequently (e.g., in response to an indication that an AP has been added to and/or removed from the wireless TSN environment).

According to some embodiments, the enhanced multiple AP coordination system may implement the multi-AP coordination protocol, which may include a second phase during which each coordinated AP may estimate a propagation delay from the associated AP to the coordinated AP. The second phase may be performed during an initiation of the associated AP and/or during an associated of a coordinated APs. An estimation of a propagation delay from the associated AP to the coordinated AP may be performed using single user protocol (e.g., fine timing measurement (FTM) and/or a single user scheme set forth in 802.11az) or using a multi-user protocol (e.g., a multi-user protocol set forth in 802.11ax). The second phase may be performed infrequently (for example only when a propagation delay may be supposed to have changed, such as when a distance between the coordinated APs and/or the associated AP has changed). Because many deployment scenarios may be very static, the second phase may only happen once.

According to some embodiments, the enhanced multiple AP coordination system may implement the multi-AP coordination protocol, which may include a third phase during which downlink data may be sent to the serving STAs from each of the different coordinated APs in a simultaneous manner. The third phase may start with the associated AP sending a multi-STA trigger frame to the coordinated APs. During the third phase, each coordinated AP may compensate for the propagation delay by transmitting the downlink data in response to the received Multi-AP trigger after a time that may be equal to a SIFS minus the determined propagation delay, as explained in greater detail below. The third phase may occur every time a downlink data packet is to be sent from the coordinated APs to the STA.

According to some embodiments, the enhanced multiple AP coordination system may perform a channel sounding phase of a transmission between a master AP, a slave AP1, a slave AP2, and a STA. The channel sounding phase may be a first phase of two phases for enabling a joint transmission from multiple APs. Note that the master AP may be an associated AP. The slave AP1 and the slave AP2 may be the coordinated APs. The master AP may begin the channel sounding phase in order to facilitate a multiple AP joint transmission by synchronizing the multiple APs.

According to some embodiments, the enhanced multiple AP coordination system may implement the channel sounding phase. The channel sounding phase may enable the collection of channel state information for the joint data transmission. The master AP may send a null data packet announce (NDPA) frame to all of the slave APs, such as slave AP1 and slave AP2 in this example. The NDPA may indicate a beginning of a channel sounding phase between the master AP and the slave AP1 and the slave AP2. The master AP may send the NDPA frame to the slave AP1 and the slave AP2 at a time $t_0$. The time $t_0$ may serve as a reference time for the purposes of a multi-AP coordination procedure.

According to some embodiments, the enhanced multiple AP coordination system may cause the slave AP1 and slave AP2 to receive the NDPA from the master AP. In response, the slave AP1 may send a null data packet (NDP) upon the reception of the NDPA frame at time equal to $t_0+t_{SIFS}+t_{Prop.\ Delay,1}+\Delta_{SOP,1}$. Similarly, the slave AP2 may send an NDP upon the reception of the NDPA frame at a time equal to $t_0+t_{SIFS}+t_{Prop.\ Delay,2}+\Delta_{SOP,2}$. The terms $t_{Prop.\ Delay,1}$ and $t_{Prop.\ Delay,2}$ are the respective propagation delays from master AP to slave AP1 and to slave AP2, respectively. The terms $\Delta_{SOP,1}$ and $\Delta_{SOP,2}$ are the respective timing errors generated due to the start of a packet detection procedure at slave AP 1 and slave AP2, respectively.

According to some embodiments, upon the reception of the NDP from slave AP1 and slave AP2, the enhanced multiple AP coordination system may cause the STA1 to estimate the channel statement information (e.g., $H_1(t_0+\Delta_1)$ and $H_2(t_0+\Delta_2)$). The terms $\Delta_1$ and $\Delta_2$ are the time terms due to SIFS, propagation delay, and timing errors (e.g., $\Delta_1$ is equal to $t_{SIFS}+t_{Prop.\ Delay,1}+\Delta_{SOP,1}$ and $\Delta_2$ is equal to $t_{SIFS}+t_{Prop.\ Delay,2}+\Delta_{SOP,2}$). The STA1 may send feedback that includes the channel statement information to the slave AP1 and the slave AP2 for the following multiple AP joint data transmission.

According to some embodiments, the enhanced multiple AP coordination system may implement the data transmission phase for enabling a joint transmission from multiple APs. As noted above, the channel sounding phase may be a first phase of two phases for enabling a joint transmission from multiple APs. The second phase may be the data transmission phase. The data transmission phase includes the exchange of frames between a master AP, a slave AP1, a slave AP2, and a STA.

According to some embodiments, the enhanced multiple AP coordination system may cause the master AP to send a trigger frame to the slave AP1 and the slave AP2. The trigger frame may indicate the beginning of the data transmission phase of a joint transmission to a STA. The master AP may send the trigger frame to the slave AP1 and the slave AP2 at a time $t_1$. The time $t_1$ may serve as a reference time for the purposes of a multi-AP coordination procedure.

According to some embodiments, the enhanced multiple AP coordination system may cause the slave AP1 and the slave AP2 to prepare the data to be sent to the STA1 (using the CSI feedback received during the channel sounding phase) upon the reception of the trigger frame and may send the data to the STA1 at a time equal to $t_1 + t_{SIFS} + t_{Prop.\ Delay,1} + \Delta'_{SOP,1}$. Similarly, the slave AP2 may send the data to the STA1 at a time equal to $t_1 + t_{SIFS} + t_{Prop.\ Delay,2} + \Delta'_{SOP,2}$. Note that the $t_{Prop.\ Delay,1}$ and $t_{Prop.\ Delay,2}$ terms will be the same as compared to the channel sounding phase. The terms $\Delta'_{SOP,1}$ and $\Delta'_{SOP,2}$ are the respective timing errors generated due to the SOP detection procedure and may be different as compared to the $\Delta_{SOP,1}$ and $\Delta_{SOP,2}$ terms of the channel sounding phase. As a result, the beamforming vector generated with the CSI feedback (e.g., with $H_1(t_0+\Delta_1)$ and $H_2(t_0+\Delta_2)$) may not be able to stay orthogonal with the current channel for the data transmission (e.g., with $H_1(t_1+\Delta'_1)$ and $H_2(t_1+\Delta'_2)$). As a result, a more accurate multi-AP joint transmission procedure may be required.

According to some embodiments, the enhanced multiple AP coordination system may implement a channel sounding phase of a transmission between a master AP, a slave AP1, a slave AP2, and a STA. The channel sounding phase may be a first phase of two phases for enabling a joint transmission from multiple APs. Note that the master AP may be an associated AP. The slave AP1 and the slave AP2 may be coordinated APs. The master AP may begin the channel sounding phase in order to facilitate a multiple AP joint transmission by synchronizing the multiple APs (e.g., by synchronizing slave AP1 and slave AP2).

According to some embodiments, the enhanced multiple AP coordination system may implement the channel sounding phase. The channel sounding phase may enable the collection of channel state information for the joint data transmission. The master AP may send an NDPA frame to all of the slave APs, such as slave AP1 and slave AP2 in this example. The NDPA may indicate a beginning of a channel sounding phase between the master AP and the slave AP1 and the slave AP2. The master AP may send the NDPA frame to the slave AP1 and the slave AP2 at a time $t_0$. The time $t_0$ may serve as a reference time for the purposes of a multi-AP coordination procedure.

According to some embodiments, the enhanced multiple AP coordination system may cause the slave AP1 and slave AP2 to receive the NDPA from the master AP. In response, the slave AP1 may send an NDP upon the reception of the NDPA frame at time equal to $t_0 + t_{SIFS} + t_{Prop.\ Delay,1} + \Delta_{11az,1}$. Similarly, the slave AP2 may send an NDP upon the reception of the NDPA frame at a time equal to $t_0 + t_{SIFS} + t_{Prop.\ Delay,2} + \Delta_{11az,2}$. The terms $t_{Prop.\ Delay,1}$ and $t_{Prop.\ Delay,2}$ are the respective propagation delays from master AP to slave AP1 and to slave AP2, respectively. The terms $\Delta_{11az,1}$ and $\Delta_{11az,2}$ are the respective timing errors generated due to the start of a packet detection procedure at slave AP 1 and slave AP2, respectively.

According to some embodiments, the enhanced multiple AP coordination system may cause Multi-AP joint beamforming from multiple coordinated APs to one or multiple STAs with the 11az technique (as compared to the SOP procedure). The basic idea is that each slave AP (e.g., slave AP1 and slave AP2) may use the procedure described in 802.11az to estimate the actual packet arrival time. The slave APs may then send an NDP and/or data packet SIFS plus the current packet duration time after the current packet arrival time. Note that while the SOP timing estimation error may be up to ±0.4 μs, the timing estimation error using the 802.11az procedure may be ±5 ns timing accuracy, a significant improvement over the timing error of the SOP procedure.

According to some embodiments, upon the reception of the NDP from slave AP1 and slave AP2, the enhanced multiple AP coordination system may cause the STA1 to estimate the channel statement information (e.g., $H_1(t_0+\Delta_1)$ and $H_2(t_0+\Delta_2)$). The terms $\Delta_1$ and $\Delta_2$ are the time terms due to SIFS, propagation delay, and timing errors (e.g., $\Delta_1$ is equal to $t_{SIFS} + t_{Prop.\ Delay,1} + \Delta_{11az,1}$ and $\Delta_2$ is equal to $t_{SIFS} + t_{Prop.\ Delay,2} + \Delta_{11az,2}$). The STA1 may send feedback that includes the channel statement information to the slave AP1 and the slave AP2 for the following multiple AP joint data transmission.

According to some embodiments, the enhanced multiple AP coordination system may implement the data transmission phase for enabling a joint transmission from multiple APs. As noted above, the channel sounding phase may be a first phase of two phases for enabling a joint transmission from multiple APs. The second phase may be the data transmission phase. The data transmission phase includes the exchange of frames between a master AP, a slave AP1, a slave AP2, and a STA.

According to some embodiments, the enhanced multiple AP coordination system may cause the master AP to send a trigger frame to the slave AP1 and the slave AP2. The trigger frame may indicate the beginning of the data transmission phase of a joint transmission to a STA. The master AP may send the trigger frame to the slave AP1 and the slave AP2 at a time $t_1$. The time $t_1$ may serve as a reference time for the purposes of a multi-AP coordination procedure.

According to some embodiments, the enhanced multiple AP coordination system may cause the slave AP1 and the slave AP2 to prepare the data to be sent to the STA (using the CSI feedback received during the channel sounding phase) upon the reception of the trigger frame and may send the data to the STA at a time equal to $t_1 + t_{SIFS} + t_{Prop.\ Delay,1} + \Delta'_{11az,1}$. Similarly, the slave AP2 may send the data to the STA at a time equal to $t_1 + t_{SIFS} + t_{Prop.\ Delay,2} + \Delta'_{11az,2}$. Note that the $t_{Prop.\ Delay,1}$ and $t_{Prop.\ Delay,2}$ terms may be the same as compared to those terms for the channel sounding phase. The terms $\Delta'_{11az,1}$ and $\Delta'_{11az,2}$ are the respective timing errors generated due to the 802.11az detection procedure and may be different as compared to the $\Delta_{11az,1}$ and $\Delta_{11az,2}$ terms of the channel sounding phase, although to a lesser extent as compared to the $\Delta_{SOP,1}$ and $\Delta_{SOP,2}$ terms of the channel sounding phase. As a result, the beamforming vector generated with the CSI feedback (e.g., with $H_1(t_0+\Delta_1)$ and $H_2(t_0+\Delta_2)$) may be able to stay orthogonal with the current channel for the data transmission (e.g., with $H_1(t_1+\Delta'_1)$ and $H_2(t_1+\Delta'_2)$). As a result, a more accurate multi-AP joint transmission procedure may be achieved.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 depicts a diagram illustrating an example network environment of an illustrative enhanced multiple AP coordination system, in accordance with one or more example embodiments of the present disclosure. Wireless network 100 may include one or more user devices 120 and one or more APs 102, which may communicate in accordance with IEEE 802.11 communication standards. The user device(s) 120 may be mobile devices that are non-stationary (e.g., not having fixed locations) or may be stationary devices.

Figure 16:
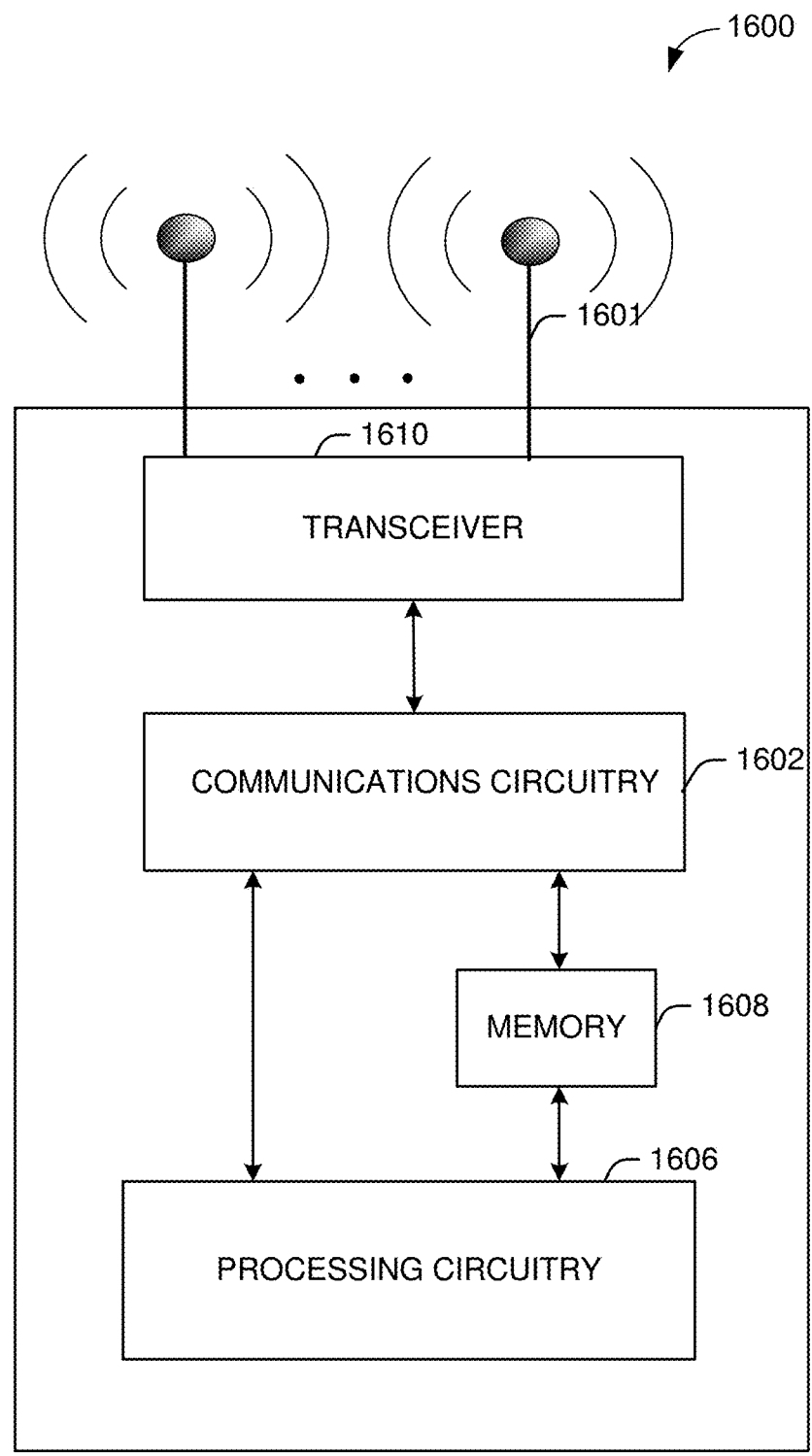
FIG. 16 depicts a functional diagram of an example communication station, in accordance with one or more example embodiments of the present disclosure.
Figure 17:
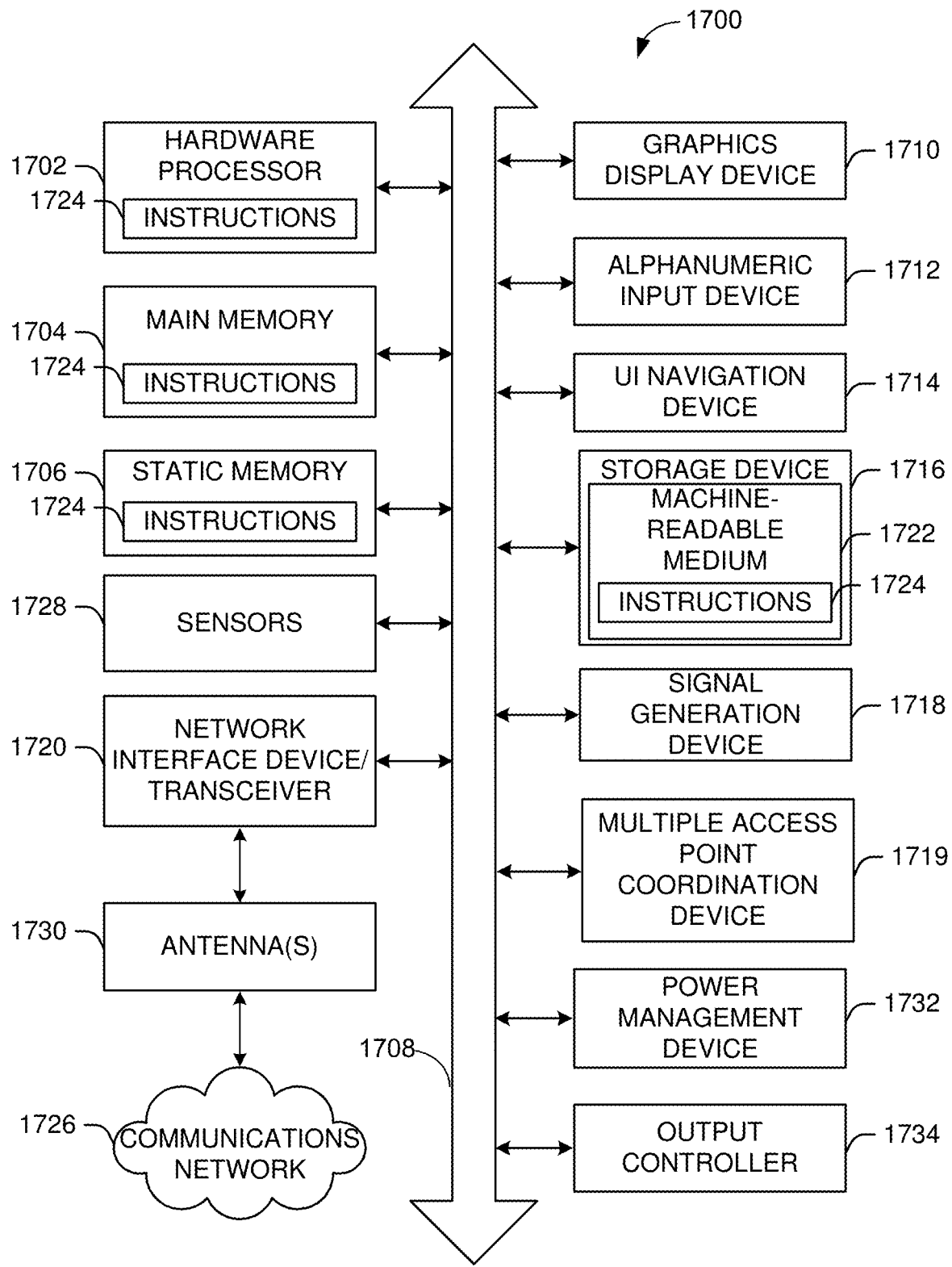
FIG. 17 depicts a block diagram of an example machine upon which any of one or more techniques (e.g., methods) may be performed, in accordance with one or more example embodiments of the present disclosure.

In some embodiments, the user devices 120, and the AP(s) 102 may include one or more computer systems similar to that of the functional diagram of FIG. 16 and/or the example machine/system of FIG. 17.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc., may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 (e.g., user devices 124, 126, 128) and/or AP(s) 102 may also include mesh stations in, for example, a mesh network, in accordance with one or more IEEE 802.11 standards and/or 3GPP standards.

Any of the user device(s) 120 (e.g., user devices 124, 126, 128) and/or AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and/or AP(s) 102 may include one or more communications antennas. The one or more communications antennas may be any suitable type of antennas corresponding to the communications protocols used by the user device(s) 120 (e.g., user devices 124, 126 and 128) and/or AP(s) 102. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input, multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 (e.g., user devices 124, 126, 128) and/or AP(s) 102.

Any of the user device(s) 120 (e.g., user devices 124, 126, 128) and/or AP(s) 102 may be configured to perform directional transmission and/or directional reception in conjunction with wirelessly communicating in a wireless network. Any of the user device(s) 120 (e.g., user devices 124, 126, 128) and/or AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128) and/or AP(s) 102 may be configured to perform any given directional transmission towards one or more defined transmit sectors. Any of the user device(s) 120 (e.g., user devices 124, 126, 128) and/or AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128) and/or AP(s) 102 may include any suitable radio and/or transceiver for transmitting and/or receiving radio frequency (RF) signals in the bandwidth and/or channels corresponding to the communications protocols utilized by any of the user device(s) 120 and/or AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the IEEE 802.11 standards.

Some embodiments may be used in conjunction with devices and/or networks operating in accordance with existing Wireless Fidelity (Wi-Fi) Alliance (WFA) Specifications, including Wi-Fi Neighbor Awareness Networking (NAN) Technical Specification (e.g., NAN and NAN2) and/or future versions and/or derivatives thereof, devices and/or networks operating in accordance with existing WFA Peer-to-Peer (P2P) specifications and/or future versions and/or derivatives thereof, devices and/or networks operating in accordance with existing Wireless-Gigabit-Alliance (WGA) specifications (Wireless Gigabit Alliance, Inc. WiGig MAC and PHY Specification) and/or future versions and/or derivatives thereof, devices and/or networks operating in accordance with existing IEEE 802.11 standards and/or amendments (e.g., 802.11b, 802.11g, 802.11n, 802.11ac, 802.11ax, 802.11ad, 802.11ay, 802.11az, etc.).

In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, a user device 120 may be in communication with one or more APs 102.

For example, AP 102 may communicate with a user device 120 by exchanging frames, including a multi-AP trigger frame 140.

It is understood that the above descriptions are for purposes of illustration and are not meant to be limiting.

Figure 2:
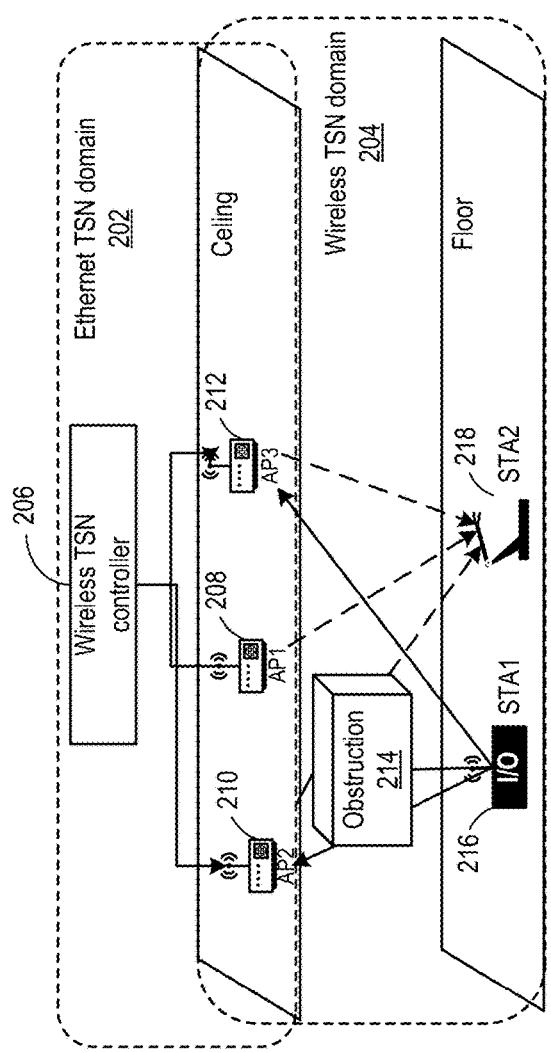
FIG. 2 depicts an illustrative schematic diagram for a wireless time sensitive networking configuration, in accordance with one or more example embodiments of the present disclosure.

FIG. 2 depicts an illustrative schematic diagram for a wireless time sensitive networking (TSN) configuration, in accordance with one or more example embodiments of the present disclosure.

Referring to FIG. 2, there is shown a wireless TSN environment 200. The wireless TSN environment 200 may be an indoor area, an outdoors area, or both. In some embodiments, the wireless TSN environment 200 may be indoors, for example as shown in FIG. 2, wherein the indoors area includes a floor and a ceiling (for example, the floor and ceiling may be located in a factory, office building, home, or the like). The wireless TSN environment 200 may include one or more TSN domains, such as Ethernet TSN domain 202 and/or Wireless TSN domain 204. The Ethernet TSN domain 202 may include a network of one or more devices that communicate using an Ethernet communication protocol. For example, the Ethernet TSN domain 202 may include a Wireless TSN controller 206, an AP1 208, an AP2 210, and/or an AP3 212. Each device in the Ethernet TSN domain 202 may communicate with one or more other devices in the Ethernet TSN domain 202 using an Ethernet communication protocol. According to some embodiments, the devices within the Ethernet TSN domain 202 may be located within a ceiling of the wireless TSN environment 200.

According to some embodiments, the wireless TSN environment 200 may include a Wireless TSN domain 204. The Wireless TSN domain 204 may include a network of one or more devices that communicate using a wireless communication protocol (e.g., a communication protocol defined in one or more IEEE 802.11 standards and/or amendments). For example, the Wireless TSN domain 204 may include a Wireless TSN controller 206, an AP1 208, an AP2 210, an AP3 212, a STA1 216, and/or a STA2 218. Note that some devices within the Wireless TSN domain 204 may also be included within the Ethernet TSN domain 202. Each device in the Wireless TSN domain 204 may communicate with one or more other devices in the Wireless TSN domain 204 using a Wireless communication protocol. According to some embodiments, the devices within the Wireless TSN domain 204 may be located within a ceiling of the wireless TSN environment 200 and/or on a floor of the wireless TSN environment 200.

According to some embodiments, the wireless TSN environment 200 may include a Wireless TSN controller 206. The Wireless TSN controller 206 may communicate with one or more devices within the Ethernet TSN domain 202. For example, the Wireless TSN controller 206 may communicate with one or more of AP1 208, AP2 210, and/or AP3 212. As discussed in greater detail below, the Wireless TSN controller 206 may select an AP (e.g., one of AP1 208, AP2 210, or AP3 212) as the associated AP for a device within Wireless TSN domain 204 (e.g., for STA2 218). The Wireless TSN controller 206 may be any of the user devices 120 (e.g., user devices 124, 126, 128) and/or AP(s) 102 as shown in FIG. 1.

According to some embodiments, the wireless TSN environment 200 may include one or more APs, such as AP1 208, AP2 210, and/or AP3 212. Note that any number of APs may be included within the wireless TSN environment 200. The APs 208, 210, and 212 within the wireless TSN environment 200 may be configured to communicate with the Wireless TSN controller 206 and with one or more of the station devices within Wireless TSN domain 204. For example, AP1 208 may be configured to communicate with STA1 216 and with STA2 218. As discussed in greater detail below, one AP may be selected (e.g., by Wireless TSN controller 206) as the associated AP for a station device and the other APs (e.g., the APs that are not selected as the associated AP) may be selected as coordinated APs. The associated AP may coordinate communication between the APs (e.g., AP1 208, AP2 210, and AP3 212) and a station device. The APs 208, 210, and 212 may be any of the AP(s) 102 as shown in FIG. 1.

According to some embodiments, the wireless TSN environment 200 may include one or more STAs, such as STA1 216 and/or STA2 218. Note that any number of STAs may be included within the wireless TSN environment 200. The STAs 216 and 218 within the wireless TSN environment 200 may be configured to communicate with one or more of the APs 208, 210, and 212 within Wireless TSN domain 204. For example, STA1 216 may be configured to communicate with AP1 208, AP2 210, and AP3 212. The STAs 216 and 218 may operate with certain minimum latency and/or reliability requirements. For example, STAs 216 and 218 may require controlled latency and high reliability for real-time applications such as gaming, robotics, and/or industrial automation. The STAs 216 and 218 may be any of the user devices 120 (e.g., user devices 124, 126, 128) as shown in FIG. 1.

Recently, the need to improve latency and reliability has been introduced in new IEEE 802.11 standard initiatives. A Real Time Applications Top Interest Group (RAT-TIG) has been created within the IEEE 802.11 working group to investigate the requirement and issues to control latency and to increase reliability for real time application including gaming, robotics, and industrial automation. Extreme high throughput (EHT) and low latency requirements have also been introduced as a goal for the next major 802.11 release.

Multi-AP coordination will be one of the major features in EHT. Multi-AP coordination may enable capacity gains as well as low latency and high reliability.

According to some embodiments, multi-AP coordination may be implemented in the uplink and in the downlink. As shown in FIG. 2, multiple coordinated APs (e.g., AP1 208, AP2 210, and/or AP3 212) may be located in different locations. These multiple coordinated APs may operate at the same channel. In the uplink, the multiple coordinated APs may be requested to receive the uplink data packet sent from the same STA (e.g., STA1 216 or STA2 218, which may be a sensor or same set of sensors) and may forward the uplink data packet (e.g., UL MU OFDMA/MIMO) to the Wireless TSN controller 206. The use of multiple coordinated APs may improve the uplink reliability, for example by taking advantage of multiple path diversity. For example, the use of multiple coordinated APs may allow high reliability even in the presence of an obstruction between one of the multiple coordinated APs and the STA, such as obstruction 214.

In the downlink, the multiple coordinated APs (e.g., AP1 208, AP2 210, and/or AP3 212) in different locations and operating at the same channels may be triggered (e.g., by an associated AP as designated by the Wireless TSN controller 206) to send the same data packet (e.g., DL MU OFDMA/DL MU MIMO) distributed from the Wireless TSN controller 206 to the same STA (e.g., STA1 216 or STA2 218, which may be an actuator or a same set of actuators) simultaneously. The use of multiple coordinated APs may improve the downlink reliability, for example by taking advantage of higher receive signal strength (RSS).

As shown in FIG. 2, the wireless TSN environment 200 may include three coordinating APs, AP1 208, AP2, 210, and AP3 212. Each coordinating AP may be associated with multiple STAs (e.g., each of AP1 208, AP2 210, and AP3 212 may be associated with both STA1 216 and with STA2 218. Note that additional APs may be present in the wireless TSN environment 200 that may not be shown in this figure. The following disclosure describes a protocol that allows for multiple AP coordination, which may allow the APs to improve the downlink performance to the actuator (e.g., STA2 218).

According to some embodiments, AP1 208 may be selected by the Wireless TSN controller 206 as the associated AP of the STA2 218. The Wireless TSN controller 206 may select the associated AP of the STA2 218 from among the APs that are in communication with STA2 218 (e.g., from among AP1 208, AP2 210, and AP3 212). All of the APs that are in communication with STA2 218 may be considered coordinated APs. The selected associated AP may follow the clear channel assessment (CCA) rules defined in the 802.11 specification to contend for the channel. The selected associated AP may send a multi-AP trigger frame to all of the coordinated APs that serve the actuator (e.g., that serve STA2 218).

According to some embodiments, the coordinated APs (e.g., AP1 208, AP2 210, and AP3 212) may transmit a downlink data packet to the STA2 218 in response to the multi-AP trigger frame. The downlink data packet may include one or more transmission parameters indicated in the multi-AP trigger frame. The downlink data packet may be sent to STA2 218 a short interframe space (SIFS) time after the reception of the multi-AP trigger frame. The downlink data packet may be received by the coordinated APs from the Wireless TSN controller 206. The downlink data packet may include the data intended for operation of the STA2 218.

According to some embodiments, the STA2 218 may receive the multi-AP trigger frame from the associated AP (e.g., from AP1 208). Upon the reception of the multi-AP trigger frame from AP1 208, the STA2 218 may wait for the downlink data packet from each of the coordinated APs (e.g., from each of AP1 208, AP2 210, and AP3 212). The STA2 218 may transmit as feedback an acknowledgement (ACK) frame to the coordinated APs a SIFS time after the successful reception of the downlink data packet.

As noted above, the STA2 218 (or the STA1 216) may be used for a real time application that includes heightened latency and reliability requirements. During the above process (e.g., during the sending of the downlink data packet to the STA2 218 from each of AP1 208, AP2 210, and AP3 212), a propagation delay of the multi-AP trigger frame from AP1 208 to the different APs (e.g., to AP2 210 and to AP3 212) and a propagation delay of the downlink data frame from the coordinated APs to the STA2 218 may be different according to their respective locations. As a result, the downlink data packet may arrive at the STA2 218 with different propagation delays, which may be hard to compensate for at the STA2 218 side.

It is understood that the above descriptions are for purposes of illustration and are not meant to be limiting.

Figure 3:
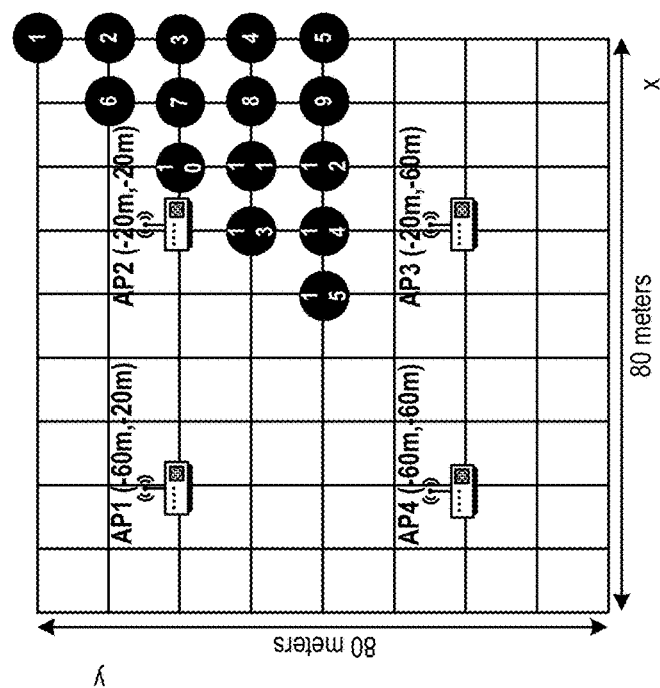
FIG. 3 depicts an illustrative schematic diagram of a multiple AP networking environment, in accordance with one or more example embodiments of the present disclosure.

FIG. 3 depicts an illustrative schematic diagram of a multiple AP networking environment, in accordance with one or more example embodiments of the present disclosure.

Referring to FIG. 3, a schematic diagram is shown for the purposes of simulating the performance of multi-AP coordination for sending a downlink data packet to a STA at various locations. In other words, to demonstrate the effect of the propagation delay to the performance of multi-AP coordination for the downlink packet, FIG. 3 illustrates a scenario for which the results of the multi-AP coordination may be simulated. As shown in FIG. 3, four APs are uniformly located in a large 80 meter by 80 meter environment (e.g., in a factory environment). For example, AP1 is located at (−20 meters, −20 meters). AP2 is located at (−60 meters, −20 meters). AP3 is located at (−20 meters, −60 meters). AP4 is located at (−60 meters, −60 meters). For the purposes of the simulation, each AP is simulated to have one antenna.

The performance of a STA with a single antenna is evaluated for 15 different locations, which are marked numerically in FIG. 3 as locations 1-15. The performance of the STA for each location is evaluated under four scenarios: 1) single AP; 2) multi-AP without accounting for any propagation delay; 3) multi-AP accounting for propagation delay from the coordinated APs to the STA; and 4) multi-AP accounting for propagation delay from the associated AP to the coordinated APs and for propagation delay from the coordinated APs to the STA. For the purposes of the simulation, the channel bandwidth is set to 20 MHz, packet size is set to 100 bytes, the modulation and coding scheme (MCS) is set to MCS7 is used, packet acquisition is on, channel D and real channel estimation is used, the transmit power of all of the APs is set to 20 dBm, the noise figure is set to 7 dB, and the path loss from the AP to the STA is calculated based on the following equation:

$$P_{Pathloss} = \begin{cases} 2*10\log10\left(\frac{4\pi d}{\lambda}\right), & d \leq d_{BP} \\ 2*10\log10\left(\frac{4\pi d_{BP}}{\lambda}\right)+3.5*10\log10\left(\frac{d}{d_{BP}}\right), & d > d_{BP} \end{cases}$$

It is understood that the above descriptions are for purposes of illustration and are not meant to be limiting.

Figure 4:
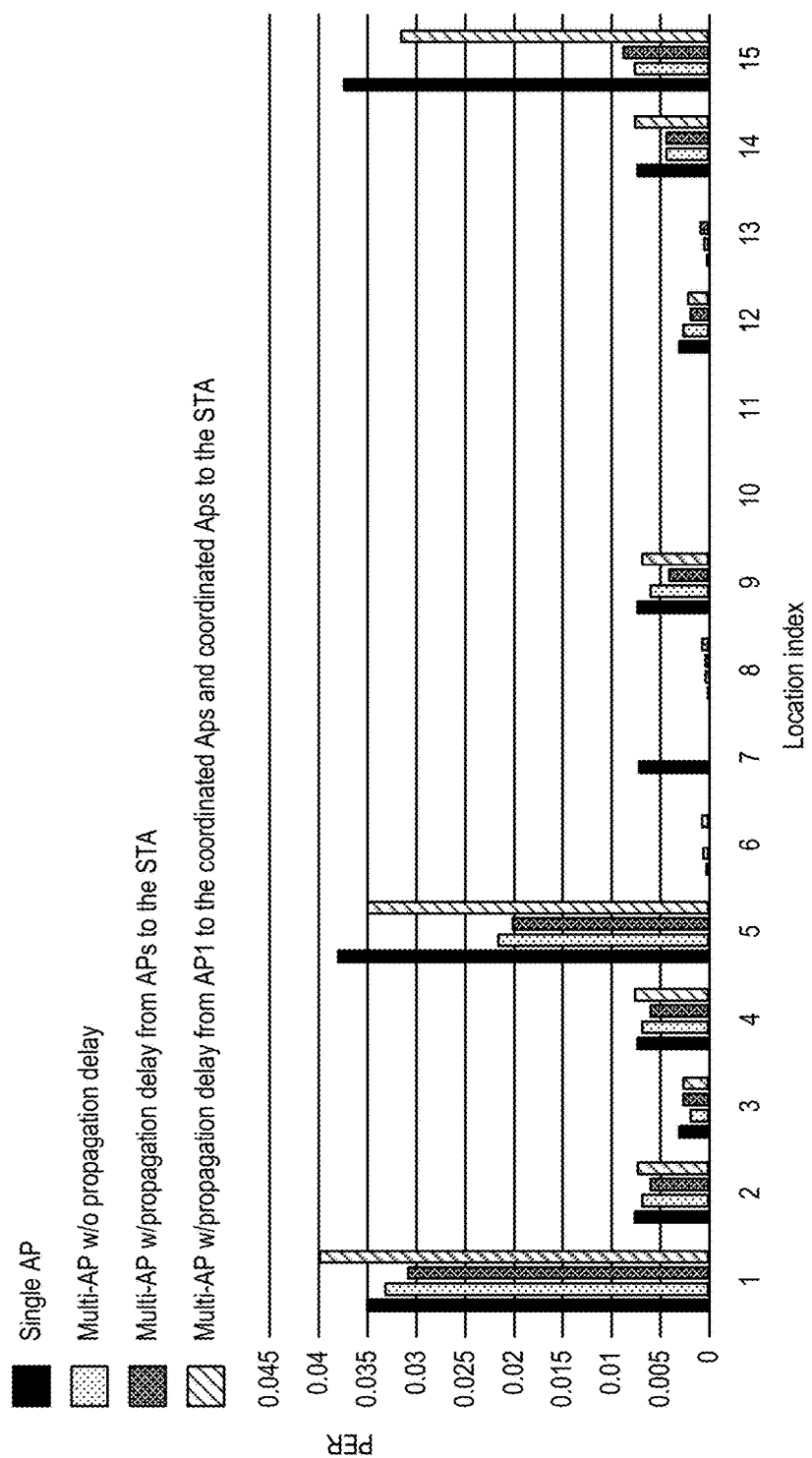
FIG. 4 depicts an illustrative chart of performance of a multiple AP networking environment, in accordance with one or more example embodiments of the present disclosure.

FIG. 4 depicts an illustrative chart of performance of a multiple AP networking environment, in accordance with one or more example embodiments of the present disclosure.

Referring to FIG. 4, the results of the simulation described above with respect to FIG. 3 are shown. Comparing the downlink performance of the STA with single-AP (e.g., scenario 1 above) to the performance of the STA multi-AP without accounting for any propagation delay (e.g., scenario 2 above), the simulation shows that when the STA is close to all of the APs (e.g., location 5, 9, 12, 14, and 15), the performance of the STA may be improved with multi-AP coordination technology. The performance of the STA may be further improved by accounting for the propagation delay from the coordinated APs to the STA (e.g., scenario 3 above). However, the benefit of multiple AP coordination may be diminished when accounting for propagation delay from the associated AP to the coordinated APs and for propagation delay from the coordinated APs to the STA (e.g., scenario 4 above). Note that the simulated performances of the STA may be different with different locations of the APs, different locations of the STA, different cyclic prefix lengths, and/or different channel conditions.

However, to avoid the effect of the propagation delay to the multiple AP coordination, it may be important to compensate the propagation delay. Removing the effect of the propagation delay from multiple APs to the STA for the downlink data transmission may be difficult. However, given that each of the coordinated APs may exchange information through a wired/wireless backbone, it may be possible to remove the effect of the propagation delay due to the trigger frame transmission. The following description proposes how to remove the effect of the propagation delay of the multi-AP trigger frame from an associated AP to multiple coordinated APs in a multi-AP coordination to improve the reliability with an enhanced multiple AP coordination performance.

Note that there may be multiple forms of multi-AP coordination, and the propagation delay problem may be expected to be relevant in different coordination methods. The multi-AP trigger method disclosed herein is only one alternative introduced as an example.

According to some embodiments, a protocol for Multi-AP joint transmissions from multiple coordinated APs to one or multiple STAs is proposed that improves performance by allowing a compensation of propagation delays between coordinated APs (e.g., so that the coordinated APs may start transmitting to a STA at the same time, or at approximately the same time).

According to some embodiments, a multi-AP coordination protocol may include three phases. A first phase may include a phase during which the multi-AP joint transmission is established and negotiated. For example, the first phase may include a capability exchange between the APs (e.g., between AP1 208 AP2 210, and AP3 212), a negotiation of parameters, an indication of the AP that has been selected as the associated AP that sends the Multi-AP trigger frame, and an indication that the other APs (e.g., the APs that are not selected as the associated AP) are designed as the coordinated APs. The first phase may be performed only once or infrequently (e.g., in response to an indication that an AP has been added to and/or removed from wireless TSN environment 200).

According to some embodiments, a multi-AP coordination protocol may include a second phase during which each coordinated AP may estimate a propagation delay from the associated AP to the coordinated AP. The second phase may be performed during an initiation of the associated AP and/or during an associated of a coordinated APs. An estimation of a propagation delay from the associated AP to the coordinated AP may be performed using single user protocol (e.g., fine timing measurement (FTM) and/or a single user scheme set forth in 802.11az) or using a multi-user protocol (e.g., a multi-user protocol set forth in 802.11ax). The second phase may be performed infrequently (for example only when a propagation delay may be supposed to have changed, such as when a distance between the coordinated APs and/or the associated AP has changed). Because many deployment scenarios may be very static, the second phase may only happen once.

According to some embodiments, a multi-AP coordination protocol may include a third phase during which downlink data may be sent to the serving STAs from each of the different coordinated APs in a simultaneous manner. The third phase may start with the associated AP (e.g., AP1 208) sending a multi-STA trigger frame to the coordinated APs. During the third phase, each coordinated AP may compensate for the propagation delay by transmitting the downlink data in response to the received Multi-AP trigger after a time that may be equal to SIFS minus the determined propagation delay, as explained in greater detail below. The third phase may occur every time a downlink data packet is to be sent from the coordinated APs to the STA.

This above-described protocol may be used to mitigate the effect of the respective propagation delays between the coordinated APs and the associated AP in a multi-AP coordination system.

To compensate the propagation delay from the associated AP (e.g., AP1 208) to all of the coordinated APs, the propagation delay between all of the coordinated APs may be estimated and/or stored in each of the coordinated APs (e.g., each of AP1 208, AP2 210, and AP3 212). The estimation of the propagation delay may be obtained through one or more of a fine time measurement (FTM) procedure and/or through a more accurate mechanism defined in the 802.11az standard. Note that 802.11az standard also defines a way to perform propagation delay estimation for multiple STAs at the same time, and propagation delay estimation may be applied so that all coordinated APs estimated the propagation delay to the selected associated AP (e.g., AP1 208) at the same time.

After each of the coordinated APs has estimated its propagation delay to the associated AP and transmitted an indication of its propagation delay to the other coordinated APs, each coordinated AP within the coordinated group of APs would have stored the propagation delay information with all of the other APs within the coordinated group of APs. This stored propagation delay information may be used according to the following procedures to improve the downlink performance to the STA (e.g., STA2 218).

According to some embodiments, AP1 208 may be selected by the Wireless TSN controller 206 as the associated AP of the STA2 218. The Wireless TSN controller 206 may select the associated AP of the STA2 218 from among the APs that are in communication with STA2 218 (e.g., from among AP1 208, AP2 210, and AP3 212). The selected associated AP may follow the clear channel assessment (CCA) rules defined in the 802.11 specification to contend for the channel. If the operation channel(s) is/are available, the selected associated AP may send a multi-AP trigger frame to all of the coordinated APs that serve the STA (e.g., that serve STA2 218, which may be an actuator).

According to some embodiments, the coordinated APs (e.g., AP1 208, AP2 210, and AP3 212) may transmit a downlink data packet to the STA2 218 in response to the multi-AP trigger frame. The downlink data packet may include one or more transmission parameters indicated in the multi-AP trigger frame. The downlink data packet may be sent to STA2 218 by a coordinated AP a short interframe space (SIFS) time after the reception of the multi-AP trigger frame minus the estimated propagation delay from the associated AP (e.g., from AP1 208) to the coordinated AP. As a result, each of the coordinated APs may send the downlink data packets to the STA at the same time (or at approximately the same time).

According to some embodiments, the STA2 218 may receive the multi-AP trigger frame from the associated AP (e.g., from AP1 208). Upon the reception of the multi-AP trigger frame from AP1 208, the STA2 218 may wait for the downlink data packet from each of the coordinated APs (e.g., from each of AP1 208, AP2 210, and AP3 212). The STA2 218 may transmit as feedback an acknowledgement (ACK) frame to the coordinated APs a SIFS time after the successful reception of the downlink data packet.

The multi-AP coordination protocol may include three phases. A first phase may include a phase during which the multi-AP joint transmission is established and negotiated. For example, the first phase may include a capability exchange between the APs (e.g., between AP1 208 AP2 210, and AP3 212), a negotiation of parameters, an indication of the AP that has been selected as the associated AP that sends the Multi-AP trigger frame, and an indication that the other APs (e.g., the APs that are not selected as the associated AP) are designed as the coordinated APs. The first phase may be performed only once or infrequently (e.g., in response to an indication that an AP has been added to and/or removed from the wireless TSN environment 200).

The multi-AP coordination protocol may include a second phase during which each coordinated AP may estimate a propagation delay from the associated AP to the coordinated AP. The second phase may be performed during an initiation of the associated AP and/or during an associated of a coordinated APs. An estimation of a propagation delay from the associated AP to the coordinated AP may be performed using single user protocol (e.g., fine timing measurement (FTM) and/or a single user scheme set forth in 802.11az) or using a multi-user protocol (e.g., a multi-user protocol set forth in 802.11ax). The second phase may be performed infrequently (for example only when a propagation delay may be supposed to have changed, such as when a distance between the coordinated APs and/or the associated AP has changed). Because many deployment scenarios may be very static, the second phase may only happen once.

The multi-AP coordination protocol may include a third phase during which downlink data may be sent to the serving STAs from each of the different coordinated APs in a simultaneous manner. The third phase may start with the associated AP (e.g., AP1 208) sending a multi-STA trigger frame to the coordinated APs. During the third phase, each coordinated AP may compensate for the propagation delay by transmitting the downlink data in response to the received Multi-AP trigger after a time that may be equal to SIFS minus the determined propagation delay, as explained in greater detail below. The third phase may occur every time a downlink data packet is to be sent from the coordinated APs to the STA.

It is understood that the above descriptions are for purposes of illustration and are not meant to be limiting.

Figure 5:
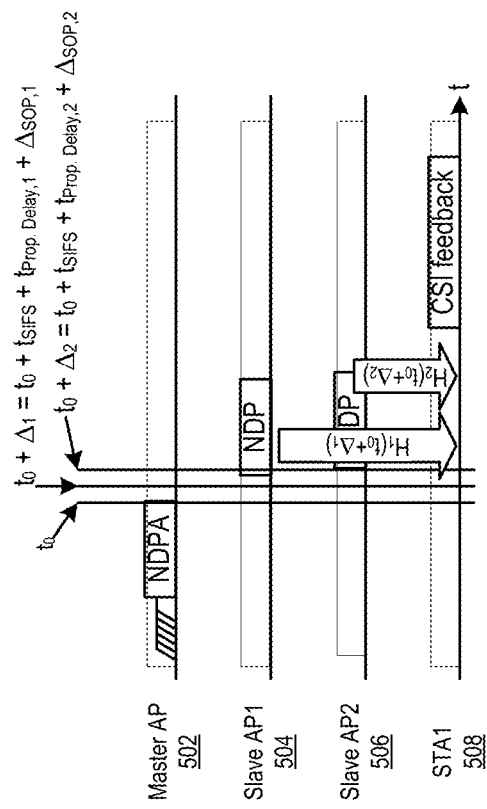
FIG. 5 depicts an illustrative schematic diagram for channel sounding for a multiple AP joint transmission, in accordance with one or more example embodiments of the present disclosure.

FIG. 5 depicts an illustrative schematic diagram for channel sounding for a multiple AP joint transmission, in accordance with one or more example embodiments of the present disclosure.

Referring to FIG. 5, a channel sounding phase of a transmission between a master AP 502, a slave AP1 504, a slave AP2 506, and a STA1 508 is shown. The channel sounding phase may be a first phase of two phases for enabling a joint transmission from multiple APs. Note that the master AP 502 of FIG. 5 may be the associated AP1 208 of FIG. 2. The slave AP1 504 and the slave AP2 506 may be the coordinated APs, AP2 210 and AP3 212, of FIG. 2. The STA1 508 may be the STA2 218 (or the STA1 216) of FIG. 2. The master AP 502 may begin the channel sounding phase in order to facilitate a multiple AP joint transmission by synchronizing the multiple APs (e.g., by synchronizing slave AP1 504 and slave AP2 506).

However, one main challenge to enable multiple AP joint transmission is the synchronization issue among multiple APs. As noted above, the multiple AP joint transmission may be separated into two phases. One phase is the channel sounding phase. The channel sounding phase may enable the collection of channel state information for the joint data transmission. As shown in FIG. 5, the master AP 502 may send a null data packet announce (NDPA) frame to all of the slave APs, such as slave AP1 504 and slave AP2 506 in this example. The NDPA may indicate a beginning of a channel sounding phase between the master AP 502 and the slave AP1 504 and the slave AP2 506. The master AP 502 may send the NDPA frame to the slave AP1 504 and the slave AP2 506 at a time $t_0$. The time $t_0$ may serve as a reference time for the purposes of a multi-AP coordination procedure.

According to some embodiments, the slave AP1 504 and slave AP2 506 may receive the NDPA from the master AP 502. In response, the slave AP1 504 may send a null data packet (NDP) upon the reception of the NDPA frame at time equal to $t_0+t_{SIFS}+t_{Prop.\ Delay,1}+\Delta_{SOP,1}$. Similarly, the slave AP2 506 may send an NDP upon the reception of the NDPA frame at a time equal to $t_0+t_{SIFS}+t_{Prop.\ Delay,2}+\Delta_{SOP,2}$. The terms $t_{Prop.\ Delay,1}$ and $t_{Prop.\ Delay,2}$ are the respective propagation delays from master AP 502 to slave AP1 504 and to slave AP2 506, respectively. The terms $\Delta_{SOP,1}$ and $\Delta_{SOP,2}$ are the respective timing errors generated due to the start of a packet detection procedure at slave AP 1 504 and slave AP2 506, respectively.

According to some embodiments, upon the reception of the NDP from slave AP1 504 and slave AP2 506, the STA1 508 may estimate the channel statement information (e.g., the channel statement information is indicated in FIG. 5 as $H_1(t_0+\Delta_1)$ and $H_2(t_0+\Delta_2)$). The terms $\Delta_1$ and $\Delta_2$ are the time terms due to SIFS, propagation delay, and timing errors (e.g., $\Delta_1$ is equal to $t_{SIFS}+t_{Prop.\ Delay,1}+\Delta_{SOP,1}$ and $\Delta_2$ is equal to $t_{SIFS}+t_{Prop.\ Delay,2}+\Delta_{SOP,2}$). The STA1 508 may send feedback that includes the channel statement information to the slave AP1 504 and the slave AP2 506 for the following multiple AP joint data transmission.

It is understood that the above descriptions are for purposes of illustration and are not meant to be limiting.

Figure 6:
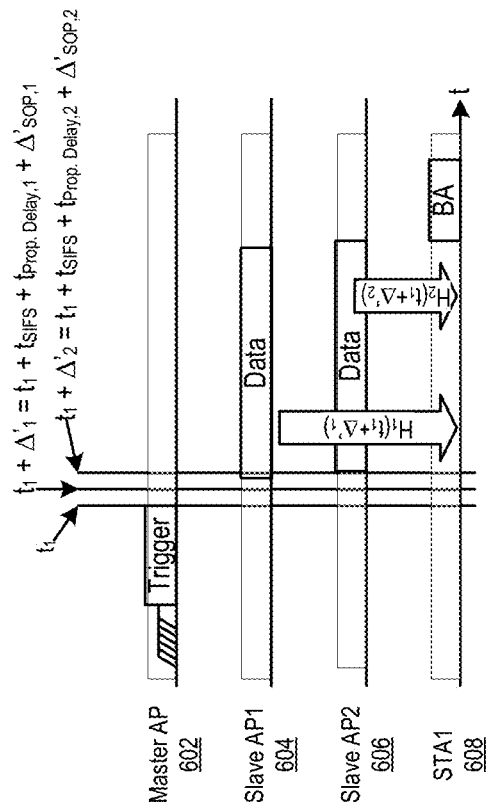
FIG. 6 depicts an illustrative schematic diagram for joint data transmission for a multiple AP joint transmission, in accordance with one or more example embodiments of the present disclosure.

FIG. 6 depicts an illustrative schematic diagram for joint data transmission for a multiple AP joint transmission, in accordance with one or more example embodiments of the present disclosure.

Referring to FIG. 6, the data transmission phase for enabling a joint transmission from multiple APs is shown. As noted above, the channel sounding phase may be a first phase of two phases for enabling a joint transmission from multiple APs. The second phase may be the data transmission phase. The data transmission phase includes the exchange of frames between a master AP 602, a slave AP1 604, a slave AP2 606, and a STA1 608. Note that the master AP 602, the slave AP1 604, the slave AP2 606, and the STA1 608 may correspond to the master AP 502, the slave AP1 504, the slave AP2 506, and the STA1 508 of FIG. 5.

As shown in FIG. 6, the master AP 602 may send a trigger frame to the slave AP1 604 and the slave AP2 606. The trigger frame may indicate the beginning of the data transmission phase of a joint transmission to a STA. The master AP 602 may send the trigger frame to the slave AP1 604 and the slave AP2 606 at a time $t_1$. The time $t_1$ may serve as a reference time for the purposes of a multi-AP coordination procedure.

According to some embodiments, the slave AP1 604 and the slave AP2 606 may prepare the data to be sent to the STA1 608 (using the CSI feedback received during the channel sounding phase) upon the reception of the trigger frame and may send the data to the STA1 608 at a time equal to $t_1+t_{SIFS}+t_{Prop.\ Delay,1}+\Delta'_{SOP,1}$. Similarly, the slave AP2 606 may send the data to the STA1 608 at a time equal to $t_1+t_{SIFS}+t_{Prop.\ Delay,2}+\Delta'_{SOP,2}$. Note that the $t_{Prop.\ Delay,1}$ and $t_{prop.\ Delay,2}$ terms will be the same as compared to the channel sounding phase. The terms $\Delta'_{SOP,1}$ and $\Delta'_{SOP,2}$ are the respective timing errors generated due to the SOP detection procedure and may be different as compared to the $\Delta_{SOP,1}$ and $\Delta_{SOP,2}$ terms of the channel sounding phase. As a result, the beamforming vector generated with the CSI feedback (e.g., with $H_1(t_0+\Delta_1)$ and $H_2(t_0+\Delta_2)$) may not be able to stay orthogonal with the current channel for the data transmission (e.g., with $H_1(t_1+\Delta'_1)$ and $H_2(t_1+\Delta'_2)$). As a result, a more accurate multi-AP joint transmission procedure may be required.

It is understood that the above descriptions are for purposes of illustration and are not meant to be limiting.

Figure 7:
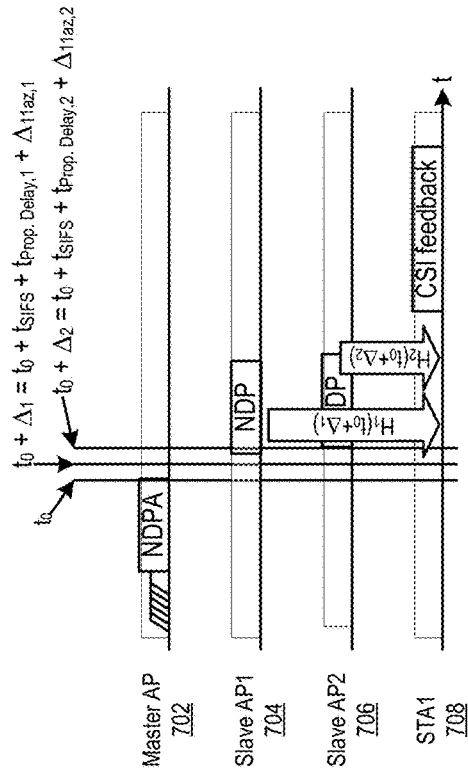
FIG. 7 depicts an illustrative schematic diagram for channel sounding for a multiple AP joint transmission using fine timing measurement (FTM), in accordance with one or more example embodiments of the present disclosure.

FIG. 7 depicts an illustrative schematic diagram for channel sounding for a multiple AP joint transmission using fine timing measurement (FTM), in accordance with one or more example embodiments of the present disclosure.

Referring to FIG. 7, a channel sounding phase of a transmission between a master AP 702, a slave AP1 704, a slave AP2 706, and a STA1 708 is shown. Note that the master AP 702, the slave AP1 704, the slave AP2 706, and the STA1 708 may correspond to the master AP 502, the slave AP1 504, the slave AP2 506, and the STA1 508 of FIG. 5. The channel sounding phase may be a first phase of two phases for enabling a joint transmission from multiple APs. Note that the master AP 702 of FIG. 7 may be the associated AP1 208 of FIG. 2. The slave AP1 704 and the slave AP2 706 may be the coordinated APs, AP2 210 and AP3 212, of FIG. 2. The STA1 708 may be the STA2 218 (or the STA1 216) of FIG. 2. The master AP 702 may begin the channel sounding phase in order to facilitate a multiple AP joint transmission by synchronizing the multiple APs (e.g., by synchronizing slave AP1 704 and slave AP2 706).

As noted above, the multiple AP joint transmission may be separated into two phases. One phase is the channel sounding phase. The channel sounding phase may enable the collection of channel state information for the joint data transmission. As shown in FIG. 7, the master AP 702 may send an NDPA frame to all of the slave APs, such as slave AP1 704 and slave AP2 706 in this example. The NDPA may indicate a beginning of a channel sounding phase between the master AP 702 and the slave AP1 704 and the slave AP2 706. The master AP 702 may send the NDPA frame to the slave AP1 704 and the slave AP2 706 at a time $t_0$. The time $t_0$ may serve as a reference time for the purposes of a multi-AP coordination procedure.

Figure 8:
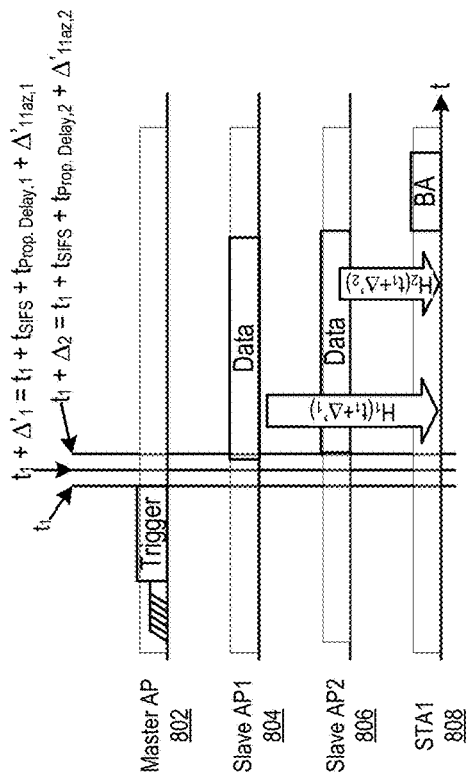
FIG. 8 depicts an illustrative schematic diagram for joint data transmission for a multiple AP joint transmission using FTM, in accordance with one or more example embodiments of the present disclosure.

According to some embodiments, the slave AP1 704 and slave AP2 706 may receive the NDPA from the master AP 702. In response, the slave AP1 704 may send an NDP upon the reception of the NDPA frame at time equal to $t_0+t_{SIFS}+t_{Prop.\ Delay,1}+\Delta_{11az,1}$. Similarly, the slave AP2 706 may send an NDP upon the reception of the NDPA frame at a time equal to $t_0+t_{SIFS}+t_{Prop.\ Delay,2}+\Delta_{11az,2}$. The terms $t_{Prop.\ Delay,1}$ and $t_{Prop.\ Delay,2}$ are the respective propagation delays from master AP 702 to slave AP1 704 and to slave AP2 706, respectively. The terms $\Delta_{11az,1}$ and $\Delta_{11az,2}$ are the respective timing errors generated due to the start of a packet detection procedure at slave AP1 704 and slave AP2 706, respectively. Note that FIG. 7 illustrates the Multi-AP joint beamforming from multiple coordinated APs to one or multiple STAs with the 11az technique (as compared to the SOP procedure illustrated in FIG. 5). The basic idea is that each slave AP (e.g., slave AP1 704 and slave AP2 706) may use the procedure described in 802.11az to estimate the actual packet arrival time. The slave APs may then send an NDP and/or data packet SIFS plus the current packet duration time after the current packet arrival time (e.g., as shown in FIGS. 7 and 8). Note that while the SOP timing estimation error may be up to ±0.4 μs, the timing estimation error using the 802.11az procedure may be ±5 ns timing accuracy, a significant improvement over the timing error of the SOP procedure.

According to some embodiments, upon the reception of the NDP from slave AP1 704 and slave AP2 706, the STA1 708 may estimate the channel statement information (e.g., the channel statement information is indicated in FIG. 7 as $H_1(t_0+\Delta_1)$ and $H_2(t_0+\Delta_2)$). The terms $\Delta_1$ and $\Delta_2$ are the time terms due to SIFS, propagation delay, and timing errors (e.g., $\Delta_1$ is equal to $t_{SIFS}+t_{Prop.\ Delay,1}+\Delta_{11az,1}$ and $\Delta_2$ is equal to $t_{SIFS}+t_{Prop.\ Delay,2}+\Delta_{11az,2}$). The STA1 708 may send feedback that includes the channel statement information to the slave AP1 704 and the slave AP2 706 for the following multiple AP joint data transmission.

It is understood that the above descriptions are for purposes of illustration and are not meant to be limiting.

FIG. 8 depicts an illustrative schematic diagram for joint data transmission for a multiple AP joint transmission using FTM, in accordance with one or more example embodiments of the present disclosure.

Referring to FIG. 8, the data transmission phase for enabling a joint transmission from multiple APs is shown. As noted above, the channel sounding phase may be a first phase of two phases for enabling a joint transmission from multiple APs. The second phase may be the data transmission phase. The data transmission phase includes the exchange of frames between a master AP 802, a slave AP1 804, a slave AP2 806, and a STA1 808. Note that the master AP 802, the slave AP1 804, the slave AP2 806, and the STA1 808 may correspond to the master AP 502, the slave AP1 504, the slave AP2 506, and the STA1 508 of FIG. 5.

As shown in FIG. 8, the master AP 802 may send a trigger frame to the slave AP1 804 and the slave AP2 806. The trigger frame may indicate the beginning of the data transmission phase of a joint transmission to a STA. The master AP 802 may send the trigger frame to the slave AP1 804 and the slave AP2 806 at a time $t_1$. The time $t_1$ may serve as a reference time for the purposes of a multi-AP coordination procedure.

According to some embodiments, the slave AP1 804 and the slave AP2 806 may prepare the data to be sent to the STA1 808 (using the CSI feedback received during the channel sounding phase) upon the reception of the trigger frame and may send the data to the STA1 808 at a time equal to $t_1+t_{SIFS}+t_{Prop.\ Delay,1}+\Delta'_{11az,1}$. Similarly, the slave AP2 806 may send the data to the STA1 808 at a time equal to $t_1+t_{SIFS}+t_{Prop.\ Delay,2}+\Delta'_{11az,2}$. Note that the $t_{Prop.\ Delay,1}$ and $t_{Prop.\ Delay,2}$ terms may be the same as compared to those terms for the channel sounding phase. The terms $\Delta'_{11az,1}$ and $\Delta'_{11az,2}$ are the respective timing errors generated due to the 802.11az detection procedure and may be different as compared to the $\Delta_{11az,1}$ and $\Delta_{11az,2}$ terms of the channel sounding phase, although to a lesser extent as compared to the $\Delta_{SOP,1}$ and $\Delta_{SOP,2}$ terms of the channel sounding phase. As a result, the beamforming vector generated with the CSI feedback (e.g., with $H_1(t_0+\Delta_1)$ and $H_2(t_0+\Delta_2)$) may be able to stay orthogonal with the current channel for the data transmission (e.g., with $H_1(t_1+\Delta'_1)$ and $H_2(t_1+\Delta'_2)$). As a result, a more accurate multi-AP joint transmission procedure may be achieved.

It is understood that the above descriptions are for purposes of illustration and are not meant to be limiting.

Figure 9:
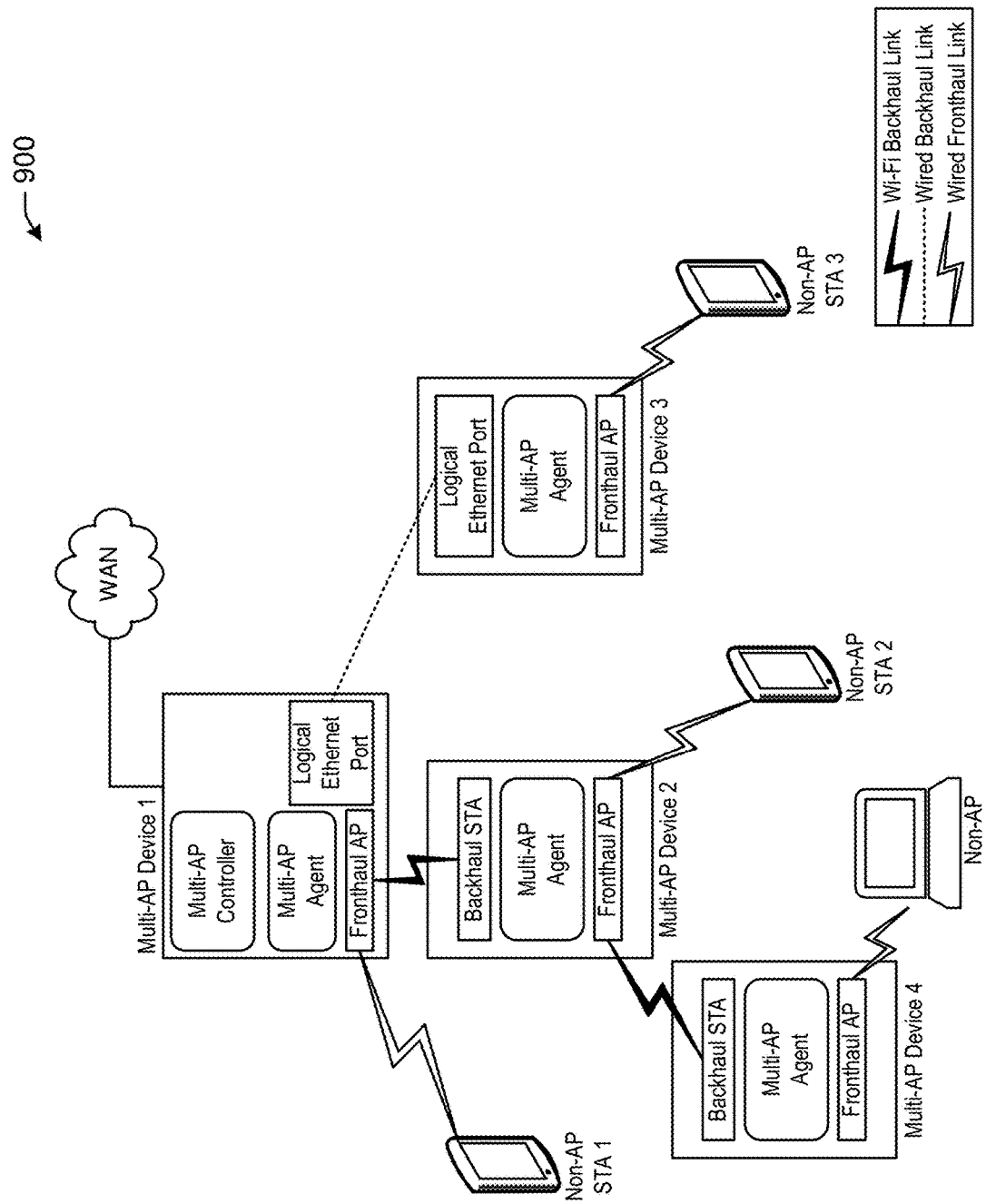
FIG. 9 depicts an illustrative schematic diagram for a multiple AP networking deployment scenario, in accordance with one or more example embodiments of the present disclosure.

FIG. 9 depicts an illustrative schematic diagram for a multiple AP networking deployment scenario, in accordance with one or more example embodiments of the present disclosure.

Referring to FIG. 9, there is shown an example of a multi-AP network with the following two key logical entities: the Multi-AP Controller and the Multi-AP Agent. The Multi-AP Controller may control the fronthaul APs and backhaul links. The multi-AP Controller may receive measurements and capabilities data and may trigger AP control-related commands and operations on the Multi-AP Agents. The Multi-AP Controller may also provide onboarding functionality to onboard and provision the Multi-AP devices onto the multi-AP network.

The Multi-AP Agent may execute the Multi-AP Controller functions and may report measurements and capabilities data. The Multi-AP Agent may interface with Wi-Fi subsystems to get measurements and capabilities data, may apply configuration changes, and may execute AP control functions. The Multi-AP device may contain a Multi-AP controller only, a Multi-AP agent only, or both a Multi-AP controller and a Multi-AP agent.

It is understood that the above descriptions are for purposes of illustration and are not meant to be limiting.

Figure 10:
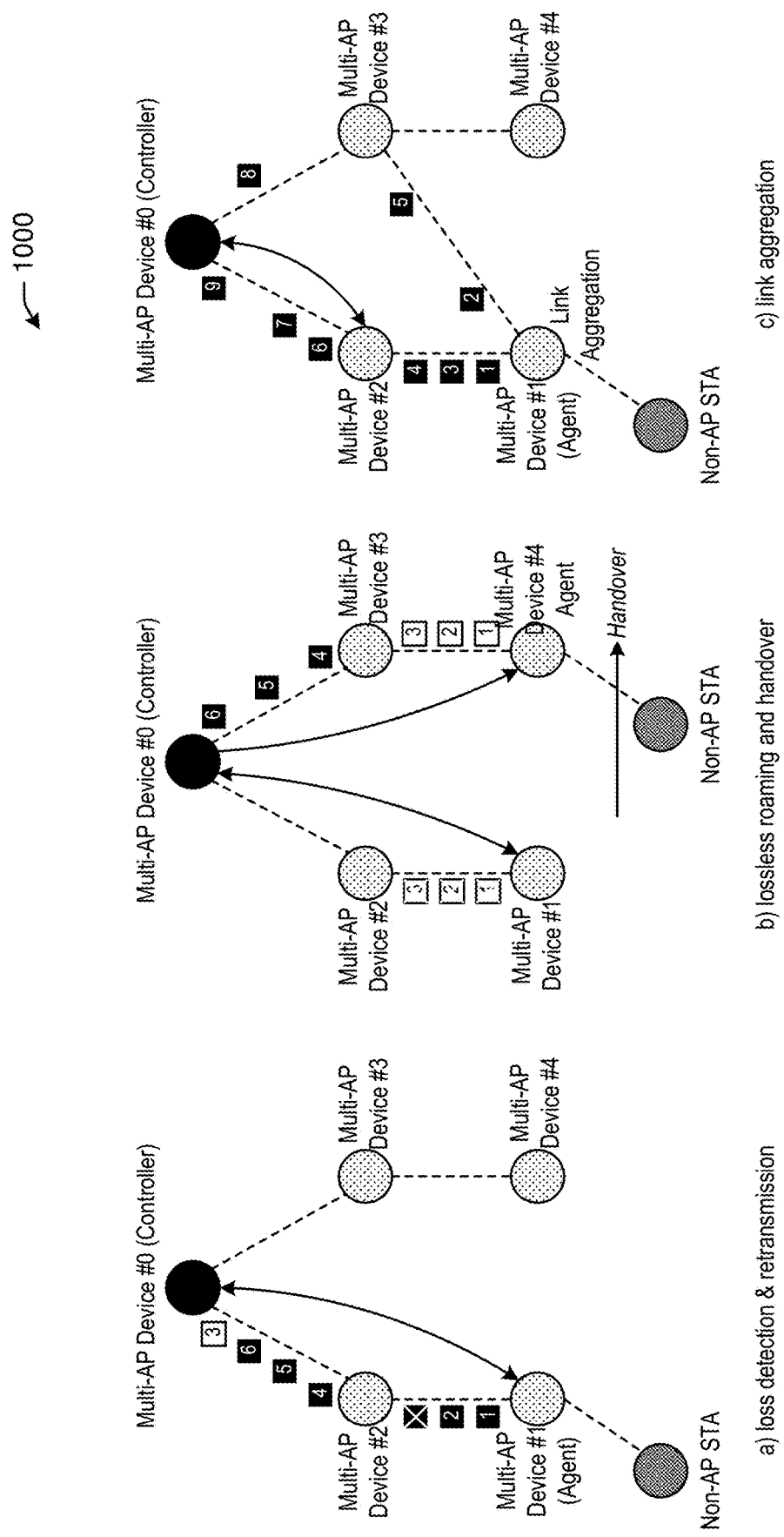
FIG. 10 depicts an illustrative schematic diagram for next generation multiple AP enhancements, in accordance with one or more example embodiments of the present disclosure.

FIG. 10 depicts an illustrative schematic diagram for next generation multiple AP enhancements, in accordance with one or more example embodiments of the present disclosure.

Referring to FIG. 10, enhancements to a multiple AP deployment scenario for the following three features in a next generation Multi-AP network are shown. A first enhancement may be loss detection and retransmission. Loss detection and retransmission may describe an ability of a Multi-AP agent to store data packets in a retransmission buffer and to trigger retransmission, for example if any packet loss (such as packet number 3 in FIG. 10) is detected. If there are multiple paths or backhaul links available between two agents, retransmission may take a different backhaul path.

A second enhancement may be lossless roaming and handover. Lossless roaming and handover may describe an ability of a Multi-AP agent to retransmit any lost packet (e.g., packet number 1, packet number 2, and/or packet number 3 in FIG. 10) when a non-AP STA roams from one fronthaul AP to another.

A third enhancement may be link aggregation. Link aggregation may describe an ability of a Multi-AP agent to send data packets over multiple backhaul links (e.g., to increase throughput and/or to mitigate congestion).

It is understood that the above descriptions are for purposes of illustration and are not meant to be limiting.

The present disclosure introduces a new data-plane function at a Multi-AP agent. This new data-plane function may handle the following tasks: encapsulate and decapsulate a "Multi-AP PDU" to include additional control information (e.g., a Sequence Number); split traffic and reorder packets that are coming from multiple links; store packets and trigger retransmissions; and/or measure and report packet loss.

Figure 11:
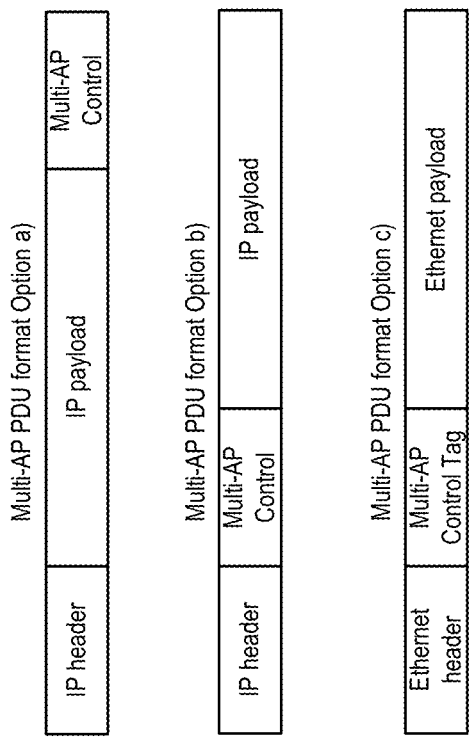
FIG. 11 depicts an illustrative schematic diagram for a multiple AP protocol data unit (PDU) frame format, in accordance with one or more example embodiments of the present disclosure.

FIG. 11 depicts an illustrative schematic diagram for a multiple AP protocol data unit (PDU) frame format, in accordance with one or more example embodiments of the present disclosure.

Referring to FIG. 11, the Multi-AP PDU frame format may include additional control information (e.g., a sequence number). Notice that the sequence number may be assigned per non-AP STA and per traffic flow. In the Multi-AP PDU frame format, a new field called, for example, the "Multi-AP Control" field, may be added according to the three format options presented in FIG. 11. For example, the Multi-AP Control field may be added either to the end of the IP payload or at the beginning of the IP payload or as a new Ethernet tag. The Multi-AP Control field may include at least the following three sub-fields: Sequence Number (4 bytes), Flow ID (1 byte), and IP Protocol Type (1 byte). Note that the Multi-AP PDU may still be an IP packet and, therefore, there may be no impact to the Layer 2 protocol (Wi-Fi or Ethernet).

Moreover, we propose to set the IP protocol type of the IP header to a reserved value (e.g., 63), indicating the presence of the Multi-AP Control field, and store the original value of the IP protocol type in the "IP protocol type" sub-field of the Multi-AP Control field.

For downlink traffic, the initiating Multi-AP agent may be at the root of a multi-AP network (e.g., Multi-AP device #1 in FIG. 9), and it may insert the Multi-AP control field to each packet. The responding Multi-AP agent (e.g. Multi-AP device #3 in FIG. 9) may be at the multi-AP device that serves non-AP STA, and it may remove the Multi-AP control field for the packets of a non-AP STA (e.g. Non-AP STA #3 in FIG. 9) that it serves.

For uplink traffic, the initiating Multi-AP agent may be at the multi-AP device that serves a non-AP STA, and it may insert the Multi-AP control field for the packets of a non-AP STA that it serves. The responding Multi-AP agent may be at the root, and it may remove the Multi-AP control field and recover the original IP packet.

Notice that the proposed enhancements may operate between two Multi-AP agents. There may be no impact to a Non-AP STA.

Referring to FIG. 11, the "Multi-AP" control field may carry the Sequence Number. The Sequence Number may allow the receiving Multi-AP agent to detect and report packet loss. The Sequence Number may also allow the receiving Multi-AP agent to perform reordering if packets are sent over multiple links.

It is understood that the above descriptions are for purposes of illustration and are not meant to be limiting.

Figure 12:
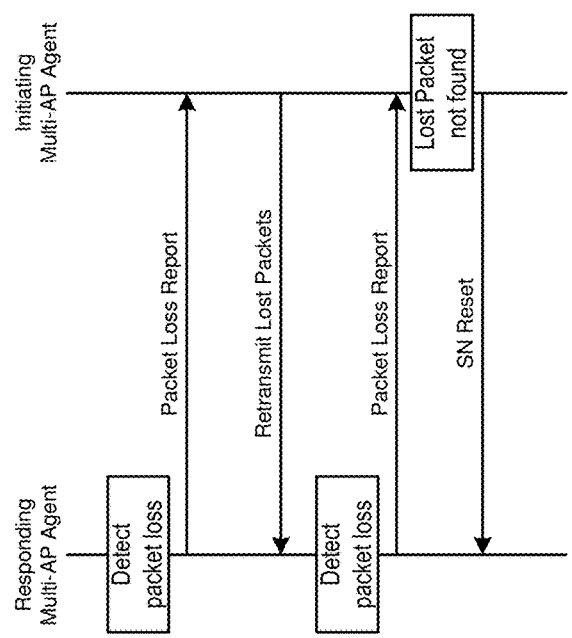
FIG. 12 depicts an illustrative schematic diagram for a loss detection and retransmission procedure, in accordance with one or more example embodiments of the present disclosure.

FIG. 12 depicts an illustrative schematic diagram for a loss detection and retransmission procedure, in accordance with one or more example embodiments of the present disclosure.

Referring to FIG. 12, a proposed loss detection and retransmission procedure is shown. According to some embodiments, it may be assumed that the buffer at the Multi-AP Agent has a limited size. Therefore, a lost packet may be too old to find. Here we propose the following control messages. A first proposed control message is a packet loss report message. The responding agent may send the "Packet Loss Report" message to report the last received in-order packet sequence number as well as the packet loss bursts. In response, the initiating agent may retransmit the lost uplink (or downlink) packets if they can be found in the retransmission buffer.

A second proposed control message is a Sequence Number (SN) Reset. The initiating agent may send the "SN Reset" message to report the SN of the oldest packet in the retransmission buffer. In response, the responding agent may consider all packets older than this packet to have been received successfully.

According to some embodiments, the Multi-AP agent may also measure and report downlink packet loss rate (PLR) periodically for every K1 seconds or every K2 packets. Here, K1 and K2 may be configured by the Multi-AP controller.

It is understood that the above descriptions are for purposes of illustration and are not meant to be limiting.

Figure 13:
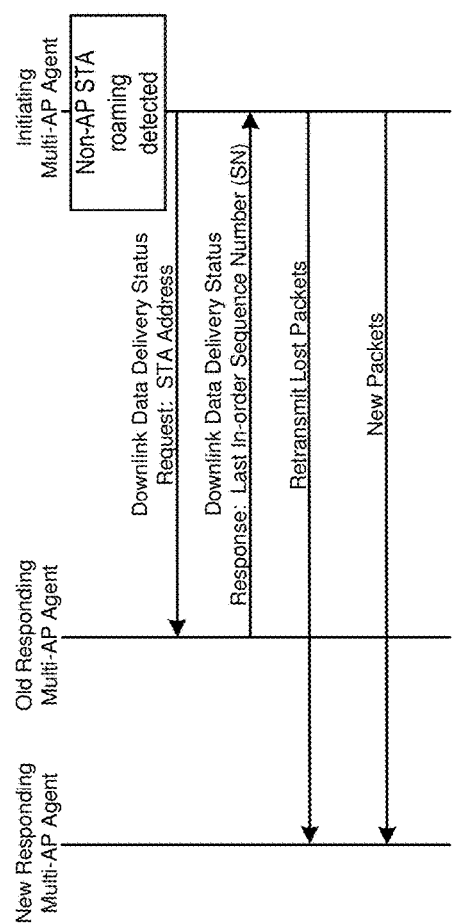
FIG. 13 depicts an illustrative schematic diagram for a lossless handover procedure, in accordance with one or more example embodiments of the present disclosure.

FIG. 13 depicts an illustrative schematic diagram for a lossless handover procedure, in accordance with one or more example embodiments of the present disclosure.

Referring to FIG. 13, a proposed lossless handover procedure is shown. Here, the procedure may be triggered by the initiating Multi-AP agent detecting that a Non-AP STA has roamed from the old responding Multi-AP Agent to the new responding Multi-AP Agent. Two new control messages are disclosed herein. A first control message is a Downlink Data Delivery (DDD) Status Request message. The initiating agent may send the "DDD status request" message for requesting the DDD status of a roaming Non-AP STA. The DDD status request message may include the MAC address of the roaming Non-AP STA.

A second control message is a DDD Status Response message. The responding agent may send the "DDD status response" message to report the SN of the last in-order packet that has been transmitted successfully to the non-AP STA. In response, the initiating Multi-AP agent may retransmit lost packets to the new Multi-AP Agent first, and then transmit new packets to the new Multi-AP Agent.

It is understood that the above descriptions are for purposes of illustration and are not meant to be limiting.

Figure 14:
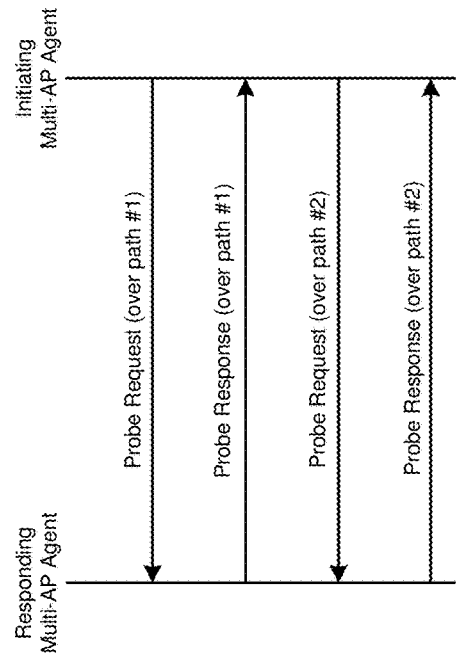
FIG. 14 depicts an illustrative schematic diagram for a multi-link probing procedure, in accordance with one or more example embodiments of the present disclosure.

FIG. 14 depicts an illustrative schematic diagram for a multi-link probing procedure, in accordance with one or more example embodiments of the present disclosure.

Referring to FIG. 14, a proposed multi-link probing procedure is shown. The multi-link probing procedure may allow the measurement of the end-to-end (e2e) round trip time (RTT) of one or more of the available backhaul paths. The multi-link probing procedure may also allow the system to dynamically balance traffic load accordingly. Here, the following two new multi-AP control messages are proposed. A first multi-AP control message is a Probe Request message. The Probe Request message may carry a sequence number for identification.

A second multi-AP control message is a Probe Response message. The Probe Response message may carry the sequence number of the corresponding Probe Request message. The Probe Response message may be sent in response to receiving the Probe Request message.

It is understood that the above descriptions are for purposes of illustration and are not meant to be limiting.

Figure 15:
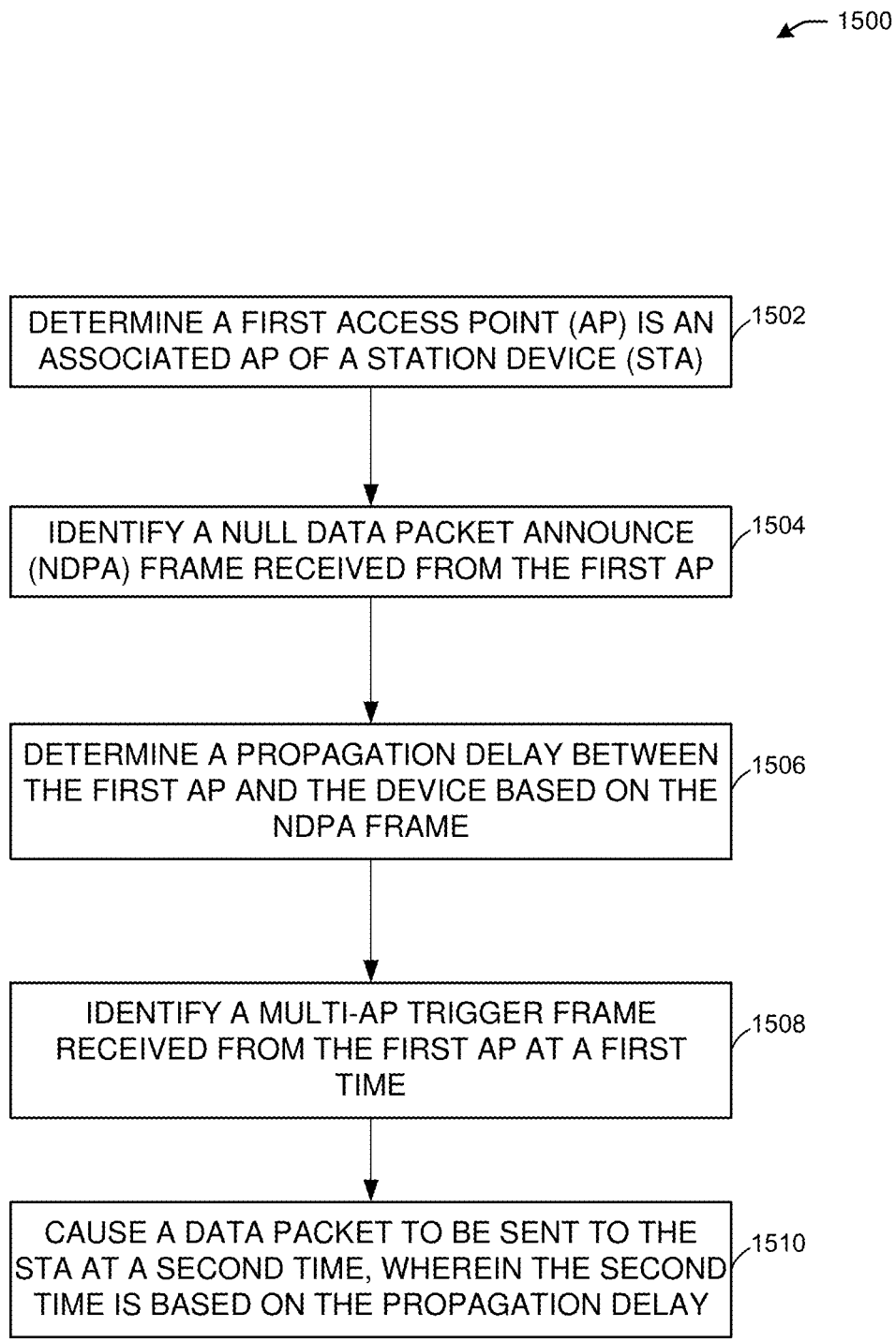
FIG. 15 depicts a flow diagram of illustrative process for an enhanced multiple AP coordination system, in accordance with one or more example embodiments of the disclosure.

FIG. 15 illustrates a flow diagram of illustrative process 1500 for an illustrative enhanced multiple AP coordination system, in accordance with one or more example embodiments of the present disclosure.

At block 1502, a device (e.g., the user device(s) 120 and/or the AP 102 of FIG. 1) may determine a first access point (AP) is an associated AP of a station device (STA). The device may determine, based on an indication received from a wireless controller, that the device is a coordinated AP. The device may comprise a transceiver configured to transmit and receive wireless signals. The device may comprise an antenna coupled to the transceiver.

At block 1504, the device may identify a null data packet announce (NDPA) frame received from the first AP.

At block 1506, the device may determine a propagation delay between the first AP and the device based on the NDPA frame. To determine the propagation delay, the device may use a fine timing measurement (FTM) procedure to determine the propagation delay. The device may cause an indication of the propagation delay to be sent to a coordinated AP.

At block 1508, the device may identify a multi-AP trigger frame received from the first AP at a first time.

At block 1510, the device may cause a data packet to be sent to the STA at a second time, wherein the second time is based on the propagation delay. The device may identify the data packet received from a wireless controller. The second time may be based on a short interframe space (SIFS) after receipt of the multi-AP trigger frame minus the propagation delay.

It is understood that the above descriptions are for purposes of illustration and are not meant to be limiting.

FIG. 16 shows a functional diagram of an exemplary communication station 1600 in accordance with some embodiments. In one embodiment, FIG. 16 illustrates a functional block diagram of a communication station that may be suitable for use as an AP 102 (FIG. 1) or a user device 120 (FIG. 1) in accordance with some embodiments. The communication station 1600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1600 may include communications circuitry 1602 and a transceiver 1610 for transmitting and receiving signals to and from other communication stations using one or more antennas 1601. The communications circuitry 1602 may include circuitry that can operate physical layer communications and/or media access control (MAC) communications for controlling access to the wireless medium, and/or any other communications layers for transmitting and receiving signals. The communication station 1600 may also include processing circuitry 1606 and memory 1608 arranged to perform the operations described herein. In some embodiments, the communications circuitry 1602 and the processing circuitry 1606 may be configured to perform operations detailed in FIGS. 1-15.

In accordance with some embodiments, the communications circuitry 1602 may be arranged to contend for a wireless medium and configure frames or packets for communicating over the wireless medium. The communications circuitry 1602 may be arranged to transmit and receive signals. The communications circuitry 1602 may also include circuitry for modulation/demodulation, upconversion/downconversion, filtering, amplification, etc. In some embodiments, the processing circuitry 1606 of the communication station 1600 may include one or more processors. In other embodiments, two or more antennas 1601 may be coupled to the communications circuitry 1602 arranged for sending and receiving signals. The memory 1608 may store information for configuring the processing circuitry 1606 to perform operations for configuring and transmitting message frames and performing the various operations described herein. The memory 1608 may include any type of memory, including non-transitory memory, for storing information in a form readable by a machine (e.g., a computer). For example, the memory 1608 may include a computer-readable storage device, read-only memory (ROM), random-access memory (RAM), magnetic disk storage media, optical storage media, flash-memory devices and other storage devices and media.

In some embodiments, the communication station 1600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1600 may include one or more antennas 1601. The antennas 1601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1600 may include one or more of a keyboard, a display, a non-volatile memory port, multiple antennas, a graphics processor, an application processor, speakers, and other mobile device elements. The display may be an LCD screen including a touch screen.

Although the communication station 1600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1600 may include one or more processors and may be configured with instructions stored on a computer-readable storage device.

FIG. 17 illustrates a block diagram of an example of a machine 1700 or system upon which any one or more of the techniques (e.g., methodologies) discussed herein may be performed. In other embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in peer-to-peer (P2P) (or other distributed) network environments. The machine 1700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708. The machine 1700 may further include a power management device 1732, a graphics display device 1710, an alphanumeric input device 1712 (e.g., a keyboard), and a user interface (UI) navigation device 1714 (e.g., a mouse). In an example, the graphics display device 1710, alphanumeric input device 1712, and UI navigation device 1714 may be a touch screen display. The machine 1700 may additionally include a storage device (i.e., drive unit) 1716, a signal generation device 1718 (e.g., a speaker), a multiple access point coordination device 1719, a network interface device/transceiver 1720 coupled to antenna(s) 1730, and one or more sensors 1728, such as a global positioning system (GPS) sensor, a compass, an accelerometer, or other sensor. The machine 1700 may include an output controller 1734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.).

The storage device 1716 may include a machine readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within the static memory 1706, or within the hardware processor 1702 during execution thereof by the machine 1700. In an example, one or any combination of the hardware processor 1702, the main memory 1704, the static memory 1706, or the storage device 1716 may constitute machine-readable media.

The multiple access point coordination device 1719 may implement a protocol that allows for multiple AP coordination, which may allow the APs to improve the downlink performance to the STA (e.g., a sensor, an actuator, or the like).

The multiple access point coordination device 1719 may select an AP as the associated AP of a STA. The enhanced multiple AP coordination system may select the associated AP of the STA from among the APs that are in communication with the STA. All of the APs (or a subset of the APs) that are in communication with the STA may be considered coordinated APs. The selected associated AP may follow the clear channel assessment (CCA) rules defined in the 802.11 specification to contend for the channel. The selected associated AP may send a multi-AP trigger frame to all of the coordinated APs that serve the actuator (e.g., that serve the STA).

The multiple access point coordination device 1719 may cause the coordinated APs to transmit a downlink data packet to the STA in response to the multi-AP trigger frame. The downlink data packet may include one or more transmission parameters indicated in the multi-AP trigger frame. The downlink data packet may be sent to the STA a short interframe space (SIFS) time after the reception of the multi-AP trigger frame. The downlink data packet may be received by the coordinated APs from the Wireless TSN controller. The downlink data packet may include the data intended for operation of the STA.

The multiple access point coordination device 1719 may cause the STA to receive the multi-AP trigger frame from the associated AP. Upon the reception of the multi-AP trigger frame from the associated AP, the STA may wait for the downlink data packet from each of the coordinated APs. The STA may transmit as feedback an acknowledgement (ACK) frame to the coordinated APs a SIFS time after the successful reception of the downlink data packet.

The multiple access point coordination device 1719 may include a STA that may be used for a real time application that includes heightened latency and reliability requirements. During the above process (e.g., during the sending of the downlink data packet to the STA from each coordinated AP, a propagation delay of the multi-AP trigger frame from the associated AP to the different coordinated APs and a propagation delay of the downlink data frame from the coordinated APs to the STA may be different according to their respective locations. As a result, the downlink data packet may arrive at the STA with different propagation delays, which may be hard to compensate for at the STA.

The multiple access point coordination device 1719 may be improved by a simulation of the performance of multi-AP coordination for sending a downlink data packet to a STA at various locations. For the purposes of the simulation, four APs are uniformly located in a large 80 meter by 80 meter environment (e.g., in a factory environment). For example, AP1 is located at (−20 meters, −20 meters). AP2 is located at (−60 meters, −20 meters). AP3 is located at (−20 meters, −60 meters). AP4 is located at (−60 meters, −60 meters). For the purposes of the simulation, each AP is simulated to have one antenna.

The multiple access point coordination device 1719 may be improved by a simulation in which the performance of a STA with a single antenna is evaluated for 15 different locations. The performance of the STA for each location is evaluated under four scenarios: 1) single AP; 2) multi-AP without accounting for any propagation delay; 3) multi-AP accounting for propagation delay from the coordinated APs to the STA; and 4) multi-AP accounting for propagation delay from the associated AP to the coordinated APs and for propagation delay from the coordinated APs to the STA.

The multiple access point coordination device 1719 may be improved by comparing the downlink performance of the STA with single-AP (e.g., scenario 1 above) to the performance of the STA multi-AP without accounting for any propagation delay (e.g., scenario 2 above). The simulation shows that when the STA is close to all of the APs (e.g., location 5, 9, 12, 14, and 15), the performance of the STA may be improved with multi-AP coordination technology. The performance of the STA may be further improved by accounting for the propagation delay from the coordinated APs to the STA (e.g., scenario 3 above). However, the benefit of multiple AP coordination may be diminished when accounting for propagation delay from the associated AP to the coordinated APs and for propagation delay from the coordinated APs to the STA (e.g., scenario 4 above). Note that the simulated performances of the STA may be different with different locations of the APs, different locations of the STA, different cyclic prefix lengths, and/or different channel conditions.

The multiple access point coordination device 1719 may avoid the effect of the propagation delay to the multiple AP coordination by compensating for the propagation delay. Removing the effect of the propagation delay from multiple APs to the STA for the downlink data transmission may be difficult. However, given that each of the coordinated APs may exchange information through a wired/wireless backbone, it may be possible to remove the effect of the propagation delay due to the trigger frame transmission. The following description proposes how to remove the effect of the propagation delay of the multi-AP trigger frame from an associated AP to multiple coordinated APs in a multi-AP coordination to improve the reliability with an enhanced multiple AP coordination performance.

The multiple access point coordination device 1719 may implement a protocol for Multi-AP joint transmissions from multiple coordinated APs to one or multiple STAs that improves performance by allowing a compensation of propagation delays between coordinated APs (e.g., so that the coordinated APs may start transmitting to a STA at the same time, or at approximately the same time).

The multiple access point coordination device 1719 may implement a multi-AP coordination protocol that may include three phases. A first phase may include a phase during which the multi-AP joint transmission is established and negotiated. For example, the first phase may include a capability exchange between the APs, a negotiation of parameters, an indication of the AP that has been selected as the associated AP that sends the Multi-AP trigger frame, and an indication that the other APs (e.g., the APs that are not selected as the associated AP) are designed as the coordinated APs. The first phase may be performed only once or infrequently (e.g., in response to an indication that an AP has been added to and/or removed from the wireless TSN environment).

The multiple access point coordination device 1719 may implement a multi-AP coordination protocol that may include a second phase during which each coordinated AP may estimate a propagation delay from the associated AP to the coordinated AP. The second phase may be performed during an initiation of the associated AP and/or during an associated of a coordinated APs. An estimation of a propagation delay from the associated AP to the coordinated AP may be performed using single user protocol (e.g., fine timing measurement (FTM) and/or a single user scheme set forth in 802.11az) or using a multi-user protocol (e.g., a multi-user protocol set forth in 802.11ax). The second phase may be performed infrequently (for example only when a propagation delay may be supposed to have changed, such as when a distance between the coordinated APs and/or the associated AP has changed). Because many deployment scenarios may be very static, the second phase may only happen once.

The multiple access point coordination device 1719 may implement a multi-AP coordination protocol that may include a third phase during which downlink data may be sent to the serving STAs from each of the different coordinated APs in a simultaneous manner. The third phase may start with the associated AP sending a multi-STA trigger frame to the coordinated APs. During the third phase, each coordinated AP may compensate for the propagation delay by transmitting the downlink data in response to the received Multi-AP trigger after a time that may be equal to SIFS minus the determined propagation delay, as explained in greater detail below. The third phase may occur every time a downlink data packet is to be sent from the coordinated APs to the STA.

The multiple access point coordination device 1719 may implement the above-described protocol to mitigate the effect of the respective propagation delays between the coordinated APs and the associated AP in a multi-AP coordination system.

The multiple access point coordination device 1719 may compensate for the propagation delay from the associated AP to all of the coordinated APs, wherein the propagation delay between all of the coordinated APs may be estimated and/or stored in each of the coordinated APs. The estimation of the propagation delay may be obtained through one or more of a fine time measurement (FTM) procedure and/or through a more accurate mechanism defined in the 802.11az standard. Note that 802.11az standard also defines a way to perform propagation delay estimation for multiple STAs at the same time, and propagation delay estimation may be applied so that all coordinated APs estimated the propagation delay to the selected associated AP at the same time.

The multiple access point coordination device 1719 may determine that after each of the coordinated APs has estimated its propagation delay to the associated AP and transmitted an indication of its propagation delay to the other coordinated APs, each coordinated AP within the coordinated group of APs would have stored the propagation delay information with all of the other APs within the coordinated group of APs. This stored propagation delay information may be used according to the following procedures to improve the downlink performance to the STA.

The multiple access point coordination device 1719 may select an AP as the associated AP of the STA. The enhanced multiple AP coordination system may select the associated AP of the STA from among the APs that are in communication with the STA. The selected associated AP may follow the CCA rules defined in the 802.11 specification to contend for the channel. If the operation channel(s) is/are available, the selected associated AP may send a multi-AP trigger frame to all of the coordinated APs that serve the STA (e.g., that serve the STA, which may be an actuator).

The multiple access point coordination device 1719 may cause the coordinated APs to transmit a downlink data packet to the STA in response to the multi-AP trigger frame. The downlink data packet may include one or more transmission parameters indicated in the multi-AP trigger frame.

The downlink data packet may be sent to the STA by a coordinated AP a short interframe space (SIFS) time after the reception of the multi-AP trigger frame minus the estimated propagation delay from the associated AP to the coordinated AP. As a result, each of the coordinated APs may send the downlink data packets to the STA at the same time (or at approximately the same time).

The multiple access point coordination device 1719 may cause the STA to receive the multi-AP trigger frame from the associated AP. Upon the reception of the multi-AP trigger frame from the associated AP, the STA may wait for the downlink data packet from each of the coordinated APs. The STA may transmit as feedback an acknowledgement (ACK) frame to the coordinated APs a SIFS time after the successful reception of the downlink data packet.

The multiple access point coordination device 1719 may implement the multi-AP coordination protocol in three phases. A first phase may include a phase during which the multi-AP joint transmission is established and negotiated. For example, the first phase may include a capability exchange between the APs, a negotiation of parameters, an indication of the AP that has been selected as the associated AP that sends the Multi-AP trigger frame, and an indication that the other APs (e.g., the APs that are not selected as the associated AP) are designed as the coordinated APs. The first phase may be performed only once or infrequently (e.g., in response to an indication that an AP has been added to and/or removed from wireless TSN environment).

The multiple access point coordination device 1719 may implement the multi-AP coordination protocol, which may include a second phase during which each coordinated AP may estimate a propagation delay from the associated AP to the coordinated AP. The second phase may be performed during an initiation of the associated AP and/or during an associated of a coordinated APs. An estimation of a propagation delay from the associated AP to the coordinated AP may be performed using single user protocol (e.g., fine timing measurement (FTM) and/or a single user scheme set forth in 802.11az) or using a multi-user protocol (e.g., a multi-user protocol set forth in 802.11ax). The second phase may be performed infrequently (for example only when a propagation delay may be supposed to have changed, such as when a distance between the coordinated APs and/or the associated AP has changed). Because many deployment scenarios may be very static, the second phase may only happen once.

The multiple access point coordination device 1719 may implement the multi-AP coordination protocol, which may include a third phase during which downlink data may be sent to the serving STAs from each of the different coordinated APs in a simultaneous manner. The third phase may start with the associated AP sending a multi-STA trigger frame to the coordinated APs. During the third phase, each coordinated AP may compensate for the propagation delay by transmitting the downlink data in response to the received Multi-AP trigger after a time that may be equal to SIFS minus the determined propagation delay, as explained in greater detail below. The third phase may occur every time a downlink data packet is to be sent from the coordinated APs to the STA.

The multiple access point coordination device 1719 may perform a channel sounding phase of a transmission between a master AP, a slave AP1, a slave AP2, and a STA. The channel sounding phase may be a first phase of two phases for enabling a joint transmission from multiple APs. Note that the master AP may be an associated AP. The slave AP1 and the slave AP2 may be the coordinated APs. The master AP may begin the channel sounding phase in order to facilitate a multiple AP joint transmission by synchronizing the multiple APs.

The multiple access point coordination device 1719 may implement the channel sounding phase. The channel sounding phase may enable the collection of channel state information for the joint data transmission. The master AP may send a null data packet announce (NDPA) frame to all of the slave APs, such as slave AP1 and slave AP2 in this example. The NDPA may indicate a beginning of a channel sounding phase between the master AP and the slave AP1 and the slave AP2. The master AP may send the NDPA frame to the slave AP1 and the slave AP2 at a time $t_0$. The time $t_0$ may serve as a reference time for the purposes of a multi-AP coordination procedure.

The multiple access point coordination device 1719 may cause the slave AP1 and slave AP2 to receive the NDPA from the master AP. In response, the slave AP1 may send a null data packet (NDP) upon the reception of the NDPA frame at time equal to $t_0+t_{SIFS}+t_{Prop.\ Delay,1}+\Delta_{SOP,1}$. Similarly, the slave AP2 may send an NDP upon the reception of the NDPA frame at a time equal to $t_0+t_{SIFS}+t_{Prop.\ Delay,2}+\Delta_{SOP,2}$. The terms $t_{Prop.\ Delay,1}$ and $t_{Prop.\ Delay,2}$ are the respective propagation delays from master AP to slave AP1 and to slave AP2, respectively. The terms $\Delta_{SOP,1}$ and $\Delta_{SOP,2}$ are the respective timing errors generated due to the start of a packet detection procedure at slave AP1 and slave AP2, respectively.

The multiple access point coordination device 1719 may, upon the reception of the NDP from slave AP1 and slave AP2, cause the STA1 to estimate the channel statement information (e.g., $H_1(t_0+\Delta_1)$ and $H_2(t_0+\Delta_2)$). The terms $\Delta_1$ and $\Delta_2$ are the time terms due to SIFS, propagation delay, and timing errors (e.g., $\Delta_1$ is equal to $t_{SIFS}+t_{Prop.\ Delay,1}+\Delta_{SOP,1}$ and $\Delta_2$ is equal to $t_{SIFS}+t_{prop.\ Delay,2}+\Delta_{SOP,2}$). The STA1 may send feedback that includes the channel statement information to the slave AP1 and the slave AP2 for the following multiple AP joint data transmission.

The multiple access point coordination device 1719 may implement the data transmission phase for enabling a joint transmission from multiple APs. As noted above, the channel sounding phase may be a first phase of two phases for enabling a joint transmission from multiple APs. The second phase may be the data transmission phase. The data transmission phase includes the exchange of frames between a master AP, a slave AP1, a slave AP2, and a STA.

The multiple access point coordination device 1719 may cause the master AP to send a trigger frame to the slave AP1 and the slave AP2. The trigger frame may indicate the beginning of the data transmission phase of a joint transmission to a STA. The master AP may send the trigger frame to the slave AP1 and the slave AP2 at a time $t_1$. The time $t_1$ may serve as a reference time for the purposes of a multi-AP coordination procedure.

The multiple access point coordination device 1719 may cause the slave AP1 and the slave AP2 to prepare the data to be sent to the STA1 (using the CSI feedback received during the channel sounding phase) upon the reception of the trigger frame and may send the data to the STA1 at a time equal to $t_1+t_{SIFS}+t_{Prop.\ Delay,1}+\Delta'_{SOP,1}$. Similarly, the slave AP2 may send the data to the STA1 at a time equal to $t_1+t_{SIFS}+t_{Prop.\ Delay,2}+\Delta'_{SOP,2}$. Note that the $t_{Prop.\ Delay,1}$ and $t_{Prop.\ Delay,2}$ terms will be the same as compared to the channel sounding phase. The terms $\Delta'_{SOP,1}$ and $\Delta'_{SOP,2}$ are the respective timing errors generated due to the SOP detection procedure and may be different as compared to the $\Delta_{SOP,1}$ and $\Delta_{SOP,2}$ terms of the channel sounding phase. As a result, the beamforming vector generated with the CSI feedback (e.g., with $H_1(t_0+\Delta_1)$ and $H_2(t_0+\Delta_2)$) may not be able to stay orthogonal with the current channel for the data transmission (e.g., with $H_1(t_1+\Delta'_1)$ and $H_2(t_1+\Delta'_2)$). As a result, a more accurate multi-AP joint transmission procedure may be required.

The multiple access point coordination device 1719 may implement a channel sounding phase of a transmission between a master AP, a slave AP1, a slave AP2, and a STA. The channel sounding phase may be a first phase of two phases for enabling a joint transmission from multiple APs. Note that the master AP may be an associated AP. The slave AP1 and the slave AP2 may be coordinated APs. The master AP may begin the channel sounding phase in order to facilitate a multiple AP joint transmission by synchronizing the multiple APs (e.g., by synchronizing slave AP1 and slave AP2).

The multiple access point coordination device 1719 may implement the channel sounding phase. The channel sounding phase may enable the collection of channel state information for the joint data transmission. The master AP may send an NDPA frame to all of the slave APs, such as slave AP1 and slave AP2 in this example. The NDPA may indicate a beginning of a channel sounding phase between the master AP and the slave AP1 and the slave AP2. The master AP may send the NDPA frame to the slave AP1 and the slave AP2 at a time $t_0$. The time $t_0$ may serve as a reference time for the purposes of a multi-AP coordination procedure.

The multiple access point coordination device 1719 may cause the slave AP1 and slave AP2 to receive the NDPA from the master AP. In response, the slave AP1 may send an NDP upon the reception of the NDPA frame at time equal to $t_0+t_{SIFS}+t_{Prop.\ Delay,1}+\Delta_{11az,1}$. Similarly, the slave AP2 may send an NDP upon the reception of the NDPA frame at a time equal to $t_0+t_{SIFS}+t_{Prop.\ Delay,2}+\Delta_{11az,2}$. The terms $t_{Prop.\ Delay,1}$ and $t_{Prop.\ Delay,2}$ are the respective propagation delays from master AP to slave AP1 and to slave AP2, respectively. The terms $\Delta_{11az,1}$ and $\Delta_{11az,2}$ are the respective timing errors generated due to the start of a packet detection procedure at slave AP 1 and slave AP2, respectively.

The multiple access point coordination device 1719 may cause Multi-AP joint beamforming from multiple coordinated APs to one or multiple STAs with the 11az technique (as compared to the SOP procedure). The basic idea is that each slave AP (e.g., slave AP1 and slave AP2) may use the procedure described in 802.11az to estimate the actual packet arrival time. The slave APs may then send an NDP and/or data packet SIFS plus the current packet duration time after the current packet arrival time. Note that while the SOP timing estimation error may be up to ±0.4 μs, the timing estimation error using the 802.11az procedure may be ±5 ns timing accuracy, a significant improvement over the timing error of the SOP procedure.

The multiple access point coordination device 1719 may, upon the reception of the NDP from slave AP1 and slave AP2, cause the STA1 to estimate the channel statement information (e.g., $H_1(t_0+\Delta_1)$ and $H_2(t_0+\Delta_2)$). The terms $\Delta_1$ and $\Delta_2$ are the time terms due to SIFS, propagation delay, and timing errors (e.g., $\Delta_1$ is equal to $t_{SIFS}+t_{Prop.\ Delay,1}+\Delta_{11az,1}$ and $\Delta_2$ is equal to $t_{SIFS}+t_{Prop.\ Delay,2}+\Delta_{11az,2}$). The STA1 may send feedback that includes the channel statement information to the slave AP1 and the slave AP2 for the following multiple AP joint data transmission.

The multiple access point coordination device 1719 may implement the data transmission phase for enabling a joint transmission from multiple APs. As noted above, the channel sounding phase may be a first phase of two phases for enabling a joint transmission from multiple APs. The second phase may be the data transmission phase. The data transmission phase includes the exchange of frames between a master AP, a slave AP1, a slave AP2, and a STA.

The multiple access point coordination device 1719 may cause the master AP to send a trigger frame to the slave AP1 and the slave AP2. The trigger frame may indicate the beginning of the data transmission phase of a joint transmission to a STA. The master AP may send the trigger frame to the slave AP1 and the slave AP2 at a time $t_1$. The time $t_1$ may serve as a reference time for the purposes of a multi-AP coordination procedure.

The multiple access point coordination device 1719 may cause the slave AP1 and the slave AP2 to prepare the data to be sent to the STA (using the CSI feedback received during the channel sounding phase) upon the reception of the trigger frame and may send the data to the STA at a time equal to $t_1+t_{SIFS}+t_{Prop.\ Delay,1}+\Delta'_{11az,1}$. Similarly, the slave AP2 may send the data to the STA at a time equal to $t_1+t_{SIFS}+t_{Prop.\ Delay,2}+\Delta'_{11az,2}$. Note that the $t_{Prop.\ Delay,1}$ and $t_{Prop.\ Delay,2}$ terms may be the same as compared to those terms for the channel sounding phase. The terms $\Delta'_{11az,1}$ and $\Delta'_{11az,2}$ are the respective timing errors generated due to the 802.11az detection procedure and may be different as compared to the $\Delta_{11az,1}$ and $\Delta_{11az,2}$ terms of the channel sounding phase, although to a lesser extent as compared to the $\Delta_{SOP,1}$ and $\Delta_{SOP,2}$ terms of the channel sounding phase. As a result, the beamforming vector generated with the CSI feedback (e.g., with $H_1(t_0+\Delta_1)$ and $H_2(t_0+\Delta_2)$) may be able to stay orthogonal with the current channel for the data transmission (e.g., with $H_1(t_1+\Delta'_1)$ and $H_2(t_1+\Delta'_2)$). As a result, a more accurate multi-AP joint transmission procedure may be achieved.

The multiple access point coordination device 1719 may carry out or perform any of the operations and processes (e.g., process 1500) described and shown above.

It is understood that the above are only a subset of what the multiple access point coordination device 1719 may be configured to perform and that other functions included throughout this disclosure may also be performed by the multiple access point coordination device 1719.

While the machine-readable medium 1722 is illustrated as a single medium, the term "machine-readable medium" may include a single medium or multiple media (e.g., a centralized or distributed database, and/or associated caches and servers) configured to store the one or more instructions 1724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1700 and that cause the machine 1700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1724 may further be transmitted or received over a communications network 1726 using a transmission medium via the network interface device/transceiver 1720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1720 may include one or more physical jacks (e.g., Ethernet, coaxial, or phone jacks) or one or more antennas to connect to the communications network 1726. In an example, the network interface device/transceiver 1720 may include a plurality of antennas to wirelessly communicate using at least one of single-input multiple-output (SIMO), multiple-input, multiple-output (MIMO), or multiple-input single-output (MISO) techniques. The term "transmission medium" shall be taken to include any intangible medium that is capable of storing, encoding, or carrying instructions for execution by the machine 1700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A first access point (AP) device, the first access point device comprising processing circuitry coupled to storage, the processing circuitry configured to:
   determine, by the first AP device, a second AP device is an associated AP of a station device (STA);
   identify, by the first AP device, a null data packet announce (NDPA) frame received from the second AP device;

determine, by the first AP device, a propagation delay between the first AP device and the second AP device based on the NDPA frame;

identify, by the first AP device, a multi-AP trigger frame received from the second AP device at a first time; and cause a data packet to be sent, by the first AP device, to the STA at a second time, wherein the second time is based on the propagation delay between the first AP device and the second AP device.

2. The first AP device of claim 1, wherein the processing circuitry is further configured to:

identify the data packet received from a wireless controller.

3. The first AP device of claim 1, wherein to determine the propagation delay, the processing circuitry is further configured to use a fine timing measurement (FTM) procedure to determine the propagation delay.

4. The first AP device of claim 1, wherein the second time is based on a short interframe space (SIFS) after receipt of the multi-AP trigger frame minus the propagation delay.

5. The first AP device of claim 1, wherein the processing circuitry is further configured to cause an indication of the propagation delay to be sent to a third AP device.

6. The first AP device of claim 1, wherein the processing circuitry is further configured to determine, based on an indication received from a wireless controller, that the first AP device is a coordinated AP.

7. The first AP device of claim 1, further comprising a transceiver configured to transmit and receive wireless signals.

8. The first AP device of claim 7, further comprising an antenna coupled to the transceiver.

9. A non-transitory computer-readable medium storing computer-executable instructions which when executed by one or more processors result in performing operations comprising:

determining, by a first access point (AP) device a second AP device is an associated AP of a station device (STA);

identifying, by the first AP device, a null data packet announce (NDPA) frame received from the second AP device;

determining, by the first AP device, a propagation delay between the first AP device and the second AP device based on the NDPA frame;

identifying, by the first AP device, a multi-AP trigger frame received from the second AP device at a first time; and causing a data packet to be sent, by the first AP device, to the STA at a second time, wherein the second time is based on the propagation delay between the first AP device and the second AP device.

10. The non-transitory computer-readable medium of claim 9, wherein the operations further comprise identifying the data packet received from a wireless controller.

11. The non-transitory computer-readable medium of claim 9, wherein to determine the propagation delay, the operations further comprise using a fine timing measurement (FTM) procedure to determine the propagation delay.

12. The non-transitory computer-readable medium of claim 9, wherein the second time is based on a short interframe space (SIFS) after receipt of the multi-AP trigger frame minus the propagation delay.

13. The non-transitory computer-readable medium of claim 9, wherein the operations further comprise causing an indication of the propagation delay to be sent to a third AP device.

14. The non-transitory computer-readable medium of claim 9, wherein the operations further comprise determining, based on an indication received from a wireless controller, that the first AP device is a coordinated AP.

15. A method comprising:

determining, by one or more processors of a first access point (AP) device a second AP device is an associated AP of a station device (STA);

identifying, by the one or more processors of the first AP device, a null data packet announce (NDPA) frame received from the second AP device;

determining, by the one or more processors of the first AP device, a propagation delay between the first AP device and the second AP device based on the NDPA frame;

identifying, by the one or more processors of the first AP device, a multi-AP trigger frame received from the second AP device at a first time; and causing, by the one or more processors of the first AP device, a data packet to be sent to the STA at a second time, wherein the second time is based on the propagation delay.

16. The method of claim 15, wherein the method further comprises identifying, by the one or more processors, the data packet received from a wireless controller.

17. The method of claim 15, wherein determining the propagation delay comprises using, by the one or more processors, a fine timing measurement (FTM) procedure.

18. The method of claim 15, wherein the second time is based on a short interframe space (SIFS) after receipt of the multi-AP trigger frame minus the propagation delay.

19. The method of claim 15, wherein the method further comprises causing, by the one or more processors, an indication of the propagation delay to be sent to a third AP device.

20. The method of claim 15, wherein the method further comprises determining, by the one or more processors, based on an indication received from a wireless controller, that the first AP device is a coordinated AP.

* * * * *